(12) United States Patent
Sato

(10) Patent No.: US 7,209,322 B2
(45) Date of Patent: Apr. 24, 2007

(54) THIN FILM MAGNETIC HEAD HAVING TOROIDALLY WOUND COIL

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 516 days.

(21) Appl. No.: 10/716,710

(22) Filed: Nov. 17, 2003

(65) Prior Publication Data

US 2004/0100731 A1 May 27, 2004

(30) Foreign Application Priority Data

| Nov. 22, 2002 | (JP) | ............................ 2002-339369 |
| Mar. 12, 2003 | (JP) | ............................ 2003-066290 |
| Aug. 14, 2003 | (JP) | ............................ 2003-293388 |

(51) Int. Cl.
*G11B 5/127* (2006.01)
(52) U.S. Cl. ..................................... 360/126
(58) Field of Classification Search ................ 360/126, 360/123, 317; 29/603.3
See application file for complete search history.

(56) References Cited

U.S. PATENT DOCUMENTS

| 5,452,168 | A | * | 9/1995 | Nepela et al. | ............... 360/126 |
| 5,828,533 | A | * | 10/1998 | Ohashi et al. | ............... 360/126 |
| 6,236,538 | B1 | * | 5/2001 | Yamada et al. | ............... 360/126 |
| 6,256,864 | B1 | | 7/2001 | Gaud et al. | |
| 6,330,128 | B1 | * | 12/2001 | Chang et al. | ............... 360/126 |
| 6,335,846 | B1 | | 1/2002 | Gaud et al. | |
| 6,353,995 | B1 | | 3/2002 | Sasaki et al. | |
| 6,466,401 | B1 | | 10/2002 | Hong et al. | |
| 6,694,603 | B1 | * | 2/2004 | Zhang et al. | ............ 29/603.03 |
| 6,778,354 | B2 | * | 8/2004 | Matono | ..................... 360/123 |
| 6,819,527 | B1 | * | 11/2004 | Dill et al. | ................... 360/123 |
| 2001/0000984 | A1 | | 5/2001 | Yoshitaka | |
| 2002/0089783 | A1 | * | 7/2002 | Matono | ..................... 360/126 |

FOREIGN PATENT DOCUMENTS

| JP | 49-110320 | 10/1974 |
| JP | 1-282715 | 11/1989 |
| JP | 4-356707 | 12/1992 |
| JP | 5-250636 | 9/1993 |
| JP | 6-103526 | 4/1994 |
| JP | 7-21522 | 1/1995 |
| JP | 7-153026 | 6/1995 |
| JP | 11-273028 | 10/1999 |
| JP | 2000-311311 | 11/2000 |
| JP | 2002-170205 | 6/2002 |

OTHER PUBLICATIONS

The Notification of Reasons for Refusal dated Feb. 3, 2006 for corresponding Japanese Patent Application No. 2003-293388.

* cited by examiner

*Primary Examiner*—Tianjie Chen
(74) *Attorney, Agent, or Firm*—Brinks Hofer Gilson & Lione

(57) ABSTRACT

A first insulating sub-layer made of an inorganic insulating material is formed on a laminate, and second insulating sub-layers made of an organic insulating layer are formed on both sides of the first insulating sub-layer in the track width direction to extend beyond both end surfaces of the laminate in the track width direction. Also, second coil pieces are formed on the first and second insulating sub-layers. Therefore, the magnetization efficiency can be improved, and insulation can be effectively secured between the laminate and the second coil pieces.

11 Claims, 16 Drawing Sheets

THIN FILM MAGNETIC HEAD HAVING TOROIDALLY WOUND COIL

BACKGROUND OF THE INVENTION

1. Field of the Invention

The present invention relates to a thin film magnetic head having a structure in which a coil is toroidally wound around a magnetic layer, and particularly to a thin film magnetic head capable of improving the magnetization efficiency and properly securing insulation between the coil and the magnetic layer.

2. Description of the Related Art

Any one of Japanese Unexamined Patent Application Publication Nos. 11-273028, 2000-311311 and 20002-170205 and U.S. Pat. No. 6,335,846 B1 discloses a structure in which a coil layer is toroidally wound around a core constituting an inductive head (recording head).

In order to effectively use a three-dimensional space around a core layer, the coil layer is preferably formed in a toroidal shape. It is expected from this that the miniaturization of an inductive head can be realized, and the magnetization efficiency can be improved.

Any of the above-described documents discloses that a lower coil layer formed below a core layer (for example, an upper magnetic layer) is electrically connected, through a connecting portion, to an upper coil layer formed above the core layer.

For example, in Japanese Unexamined Patent Application Publication Nos. 2002-311311 and 2002-170205, as shown in FIG. 16, an insulating layer 1 covers a lower coil layer 3, an insulating layer 2 is formed on a core layer 4 to extend to both sides of the core layer 4 in the track width direction, and through holes 6 are formed in both insulating layers 1 and 2 by an etching technique such as ion milling or the like. Also, connecting portions 7 are formed in the through holes 6 to connect the tops of the connecting portions 7 exposed from the through holes 6 to the bottom of an upper coil layer 5. Although these documents do not show a front view showing the lower coil layer 3, the upper coil layer 5, and the connecting portions 7 as viewed from a surface facing a recording medium, a simple front view is possibly as shown in FIG. 16 in consideration of the contents described in the documents.

However, as shown in FIG. 16, steps 8 are formed between the top of the core layer 4 and the top of the insulating layer 1, and thus the insulating layer 2 formed on the core layer 4 to extend to both sides thereof does not adhere to both side surfaces 4a of the core layer 4 in the track width direction, or a pin hole easily occurs in the insulating layer 2 deposited on both side surfaces 4a because the insulating layer 2 is very thin. Therefore, insulation cannot be sufficiently maintained between the upper coil layer 5 formed on the insulating layer 2 and both side surfaces 4a of the core layer 4 to easily cause a short circuit between the upper coil layer 5 and the core layer 4, thereby deteriorating recording characteristics.

In order to solve this problem, the deposition time of the insulating layer 2 may be simply increased to increase the thickness of the insulating layer 2 deposited on both side surfaces 4a of the core layer 4. In this case, the insulating layer 2 deposited on the top of the core layer 4 becomes excessively thick to increase the distance between the core layer 4 and the upper coil layer 5, thereby deteriorating the magnetization efficiency.

SUMMARY OF THE INVENTION

Accordingly, the present invention has been achieved for solving the above problem, and an object of the present invention is to provide a thin film magnetic head capable of improving magnetization efficiency and properly securing insulation between a coil and a magnetic layer.

A thin film magnetic head of the present invention comprises a lower core layer extending from a surface facing a recording medium in the height direction; a magnetic layer connected directly or indirectly to the lower core layer at a predetermined distance from the surface facing the recording medium; and a coil layer toroidally wound around the magnetic layer; wherein a plurality of first coil pieces extending in a direction crossing the magnetic layer is disposed on the lower core layer with predetermined intervals in the height direction; the first coil pieces are covered with a coil insulating layer on which the magnetic layer is formed; a plurality of second coil pieces crossing the magnetic layer is disposed on the magnetic layer with an insulating layer provided therebetween so that the ends of each second coil piece in the track width direction face, in the thickness direction, the respective ends of each first coil piece in the track width direction; the insulating layer comprises a first insulating sub-layer of an inorganic insulating material formed on the top of the magnetic layer, and second insulating sub-layers of an organic insulating material formed on both sides of the first insulating sub-layer in the track width direction within a region where the second coil pieces are formed with intervals in the height direction from the surface facing the recording medium; and the second insulating sub-layers extend beyond both end surfaces of the magnetic layer in the track width direction so as to be interposed between the second coil pieces and both end surfaces of the magnetic layer.

In the present invention, in the central portion in the track width direction, only the first insulating sub-layer is interposed between the magnetic layer and the second coil pieces, and thus the distance between the top of the magnetic layer and the bottoms of the second coil pieces can be appropriately decreased to improve the magnetization efficiency. Also, in a portion where the second coil pieces overlap with the second insulating sub-layers, which are formed on both sides of the first insulating sub-layer to further extend from both end surfaces of the magnetic layer in the track width direction, the second insulating sub-layers can be interposed between the second coil pieces and both end surfaces of the magnetic layer, thereby sufficiently maintaining insulation between the second coil pieces and the second insulating sub-layers.

In the present invention, the second insulating sub-layers are preferably formed on both sides of the first insulating sub-layer to have a space larger than at least the track width Tw in the track width direction.

In the present invention, the magnetic layer the magnetic layer comprises a front end portion in which the width dimension at the surface facing the recording medium corresponds to the track width, and the width dimension is maintained or gradually increases in the height direction, and a rear end portion in which the width between both base ends of the front end portion in the track width direction further increases in the height direction, and the second insulating sub-layers and second coil pieces are preferably provided on the rear end portion. Therefore, the distance between the lower surface of each second coil piece and the upper surface of the magnetic layer can be effectively decreased over a wide range, thereby properly improving the magnetization efficiency.

In the present invention, a pole tip layer comprising at least a lower pole sub-layer, a gap sub-layer made of a nonmagnetic metal material, and an upper pole sub-layer, which are formed by plating in turn from below, may be formed on the lower core layer so that the track width Tw is defined by the width dimension in the track width direction at the surface facing the recording medium, and the magnetic layer may be laminated on the pole tip layer.

In the present invention, the pole tip layer is disposed at the end of the lower core layer near the surface facing the recording medium, and the magnetic layer serves as an upper core layer which connects the pole tip layer to a rear portion of the lower core layer in the height direction. The first and second coil pieces are wound around the magnetic layer serving as the upper core layer.

In the present invention in which the magnetic layer serves as the upper core layer, the magnetic layer preferably has a lower saturation magnetic flux density than that of the upper pole sub-layer, for preventing magnetic recording outside a recording track width.

In the present invention, the average thickness of the first insulating sub-layer is preferably smaller than that of the second insulating sub-layers formed on both sides of the first insulating sub-layer. As described above, the first insulating sub-layer is made of an inorganic insulating material, and the second insulating sub-layers are made of an organic insulating material. Therefore, the average thickness of the first insulating sub-layer can easily be controlled to be smaller than that of the second insulating sub-layers, thereby permitting the manufacture of a thin film magnetic head capable of improving the magnetization efficiency and sufficiently maintaining insulation between the magnetic layer and second coil pieces.

In the present invention, the distance between the adjacent ends of at least one pair of adjacent first coil pieces in the height direction is preferably larger than the minimum distance between the first coil pieces in the region where the first coil pieces overlap with the magnetic layer.

In an inductive thin film magnetic head, the volume of a magnetic circuit through which a magnetic flux flows is preferably decreased to decrease inductance. Therefore, the length of the magnetic layer in the height direction must be decreased to decrease the distance between the adjacent first coil pieces in the region where the first coil pieces overlap with the magnetic layer. In the present invention, the distance between the adjacent ends of the first coil pieces in the height direction becomes large as described above, the ends of the first coil pieces can easily and securely be connected to the ends of the second coil pieces.

The plurality of the first coil pieces preferably has parallel portions in the region where the first coil pieces overlap with the magnetic layer, because a magnetic field induced into the magnetic layer from the coil layer is stabilized.

Also, for the same reason as described above, the distance between the adjacent ends of at least one pair of adjacent second coil pieces in the height direction is preferably larger than the minimum distance between the second coil pieces in the region where the second coil pieces overlap with the magnetic layer.

In this case, the plurality of the second coil pieces preferably has parallel portions in the region where the second coil pieces overlap with the magnetic layer.

In the present invention, in order to decrease the heat generation from the toroidal coil layer, the length dimension of each second coil piece in a first direction perpendicular to the current flow direction is preferably larger than the length dimension of the each first coil piece in the first direction, and the thickness of each second coil piece is preferably larger than the thickness of each first coil piece.

As described above, in the present invention, the first insulating sub-layer made of an inorganic insulating material is formed on the magnetic layer, and the second insulating sub-layers made of an organic insulating material are formed on both sides of the first insulating sub-layer in the track width direction to extend from both end surfaces of the magnetic layer in the track width direction. Also, the second coil pieces are provided on the first and second insulating sub-layers.

Therefore, in the central portion in the track width direction, only the first insulating sub-layer is interposed between the magnetic layer and the second coil pieces, and thus the distance between the top of the magnetic layer and the bottoms of the second coil pieces can be appropriately decreased to improve the magnetization efficiency. Also, in the region where the second coil pieces overlap with the second insulating sub-layers formed on both sides of the first insulating sub-layer to further extend from both end surfaces of the magnetic layer in the track width direction, the second insulating sub-layers can be interposed between, particularly, the upper coil pieces and both end surfaces of the magnetic layer, thereby sufficiently maintaining insulation between the upper coil pieces and the magnetic layer.

Furthermore, in the present invention, the distance between the adjacent ends of the first coil pieces and/or the second coil pieces in the height direction becomes large as described above, and thus connection between the ends of the first coil pieces and the ends of the second coil pieces can be easily and securely performed.

The plurality of the first coil pieces and/or second coil pieces has parallel portions in the region where the coil pieces overlap with the magnetic layer, and thus a magnetic field induced into the magnetic layer from the coil layer is stabilized.

DESCRIPTION OF THE PREFERRED EMBODIMENTS

Figure 1:
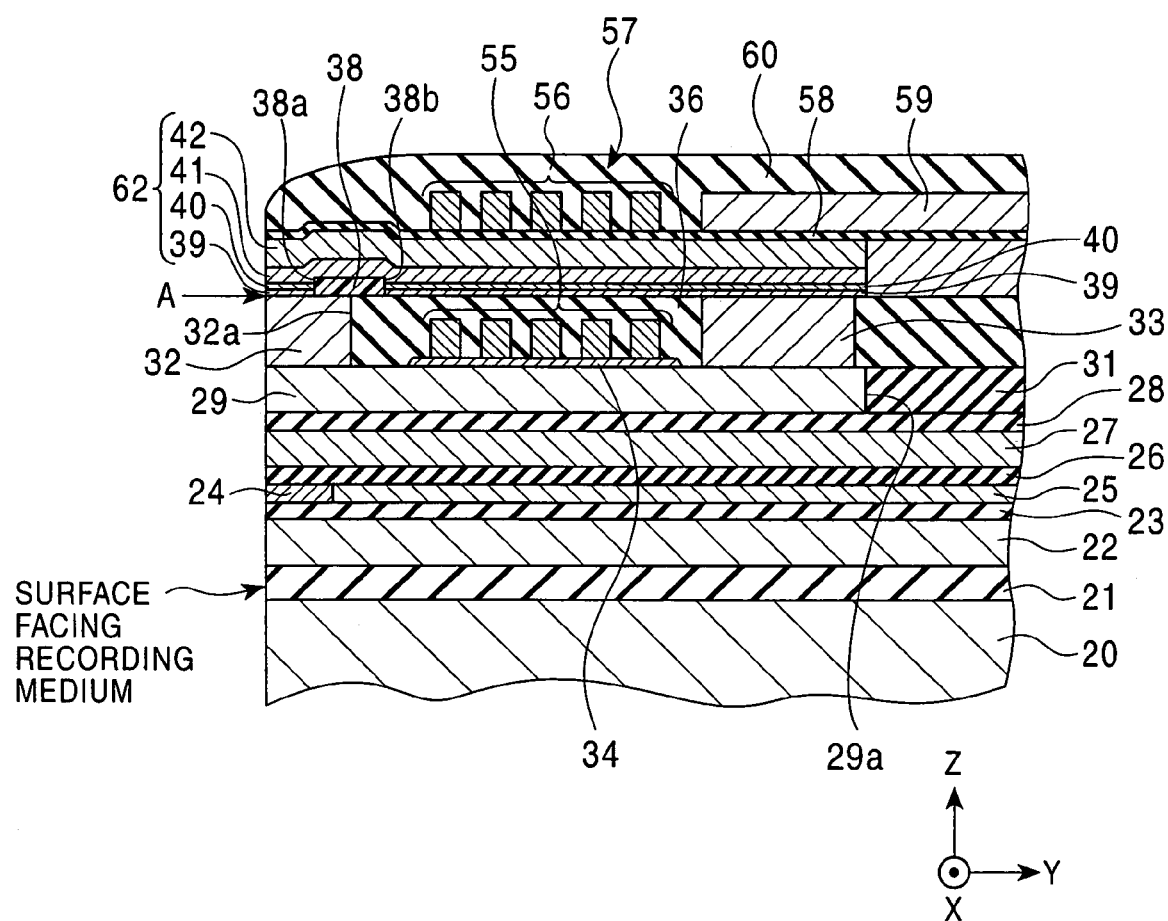
FIG. 1 is a longitudinal sectional view showing the structure of a thin film magnetic head according to a first embodiment of the present invention.
Figure 2:
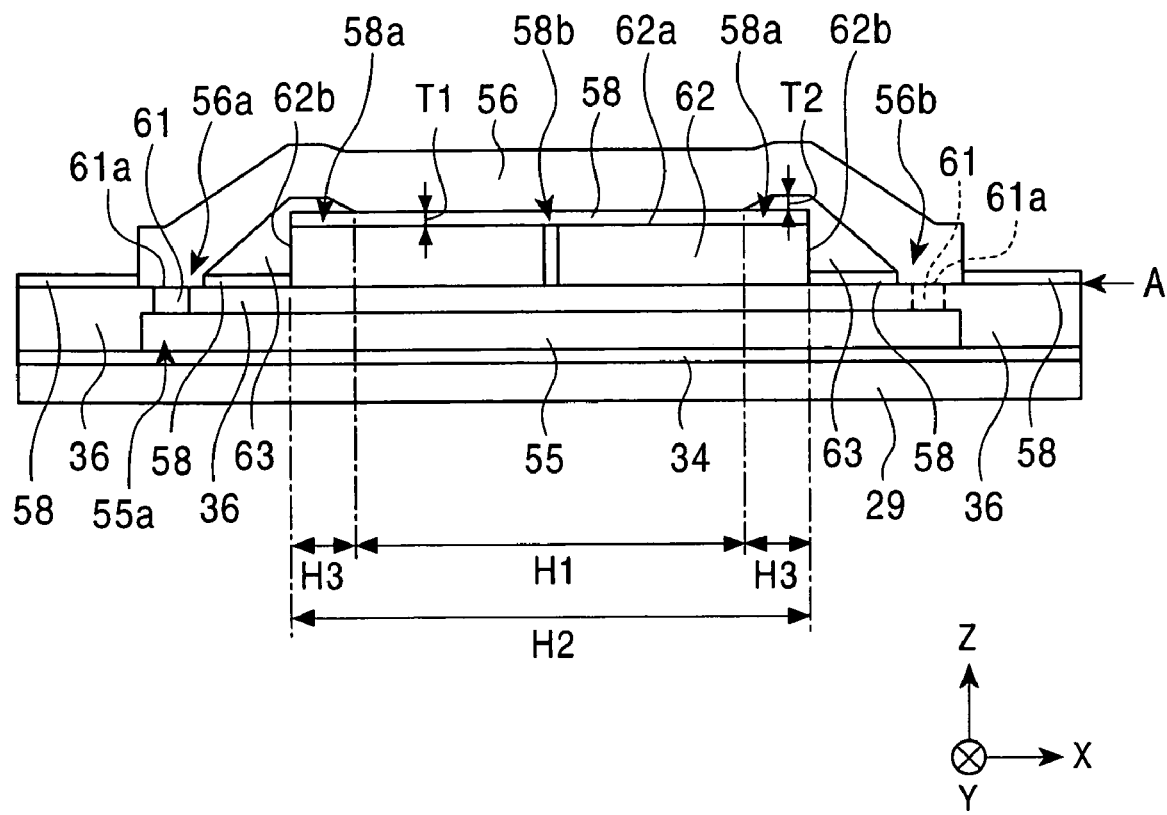
FIG. 2 is a partial front view of the thin film magnetic head shown in FIG. 1.
Figure 3:
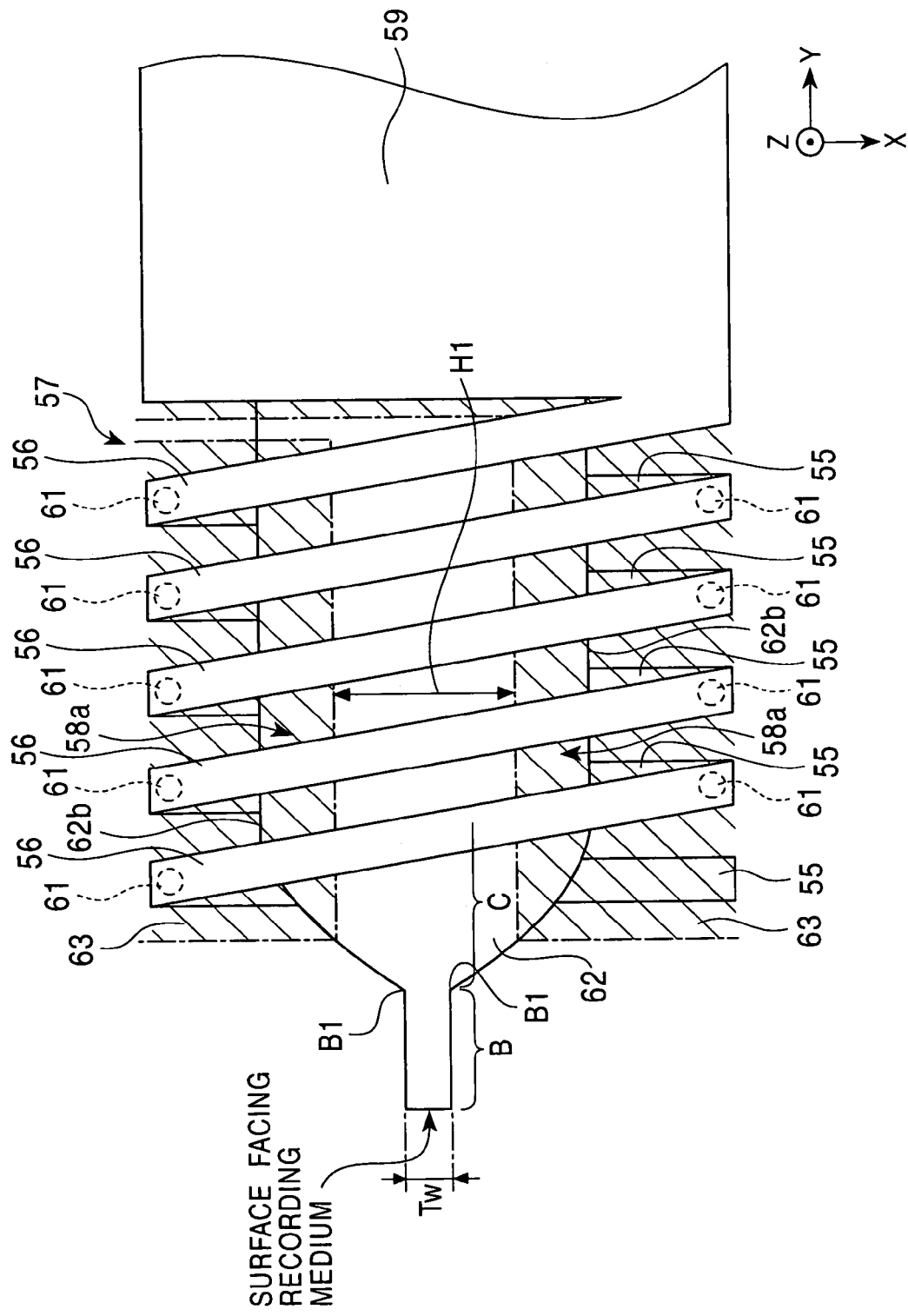
FIG. 3 is a partial plan view showing the coil shape of a coil layer and the positional relationship between the coil layer and a magnetic pole layer of the thin film magnetic head shown in FIG. 1.
Figure 4:
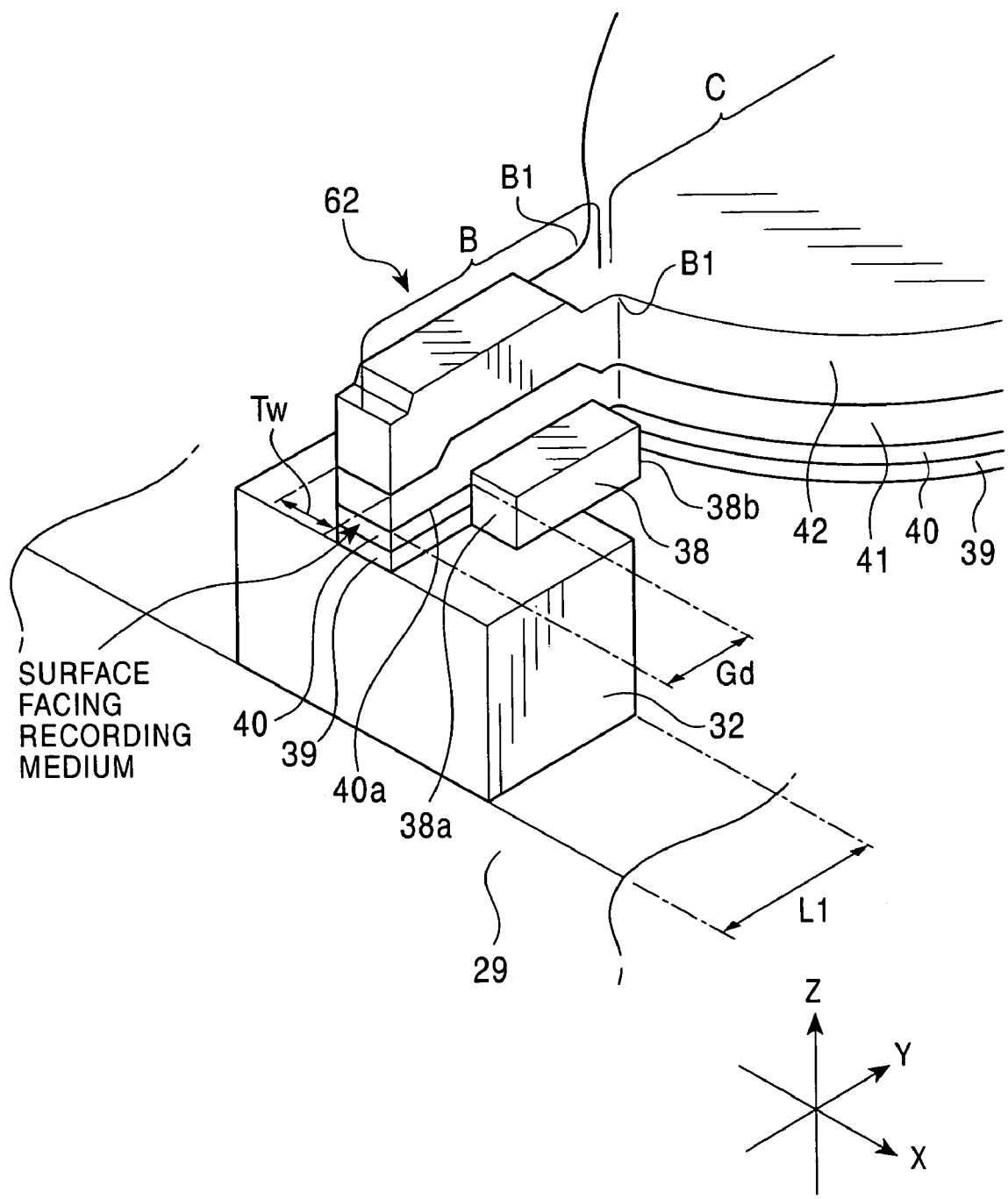
FIG. 4 is an enlarged partial perspective view of the thin film magnetic head shown in FIG. 1.

FIG. 1 is a longitudinal partial sectional view showing the structure of a thin film magnetic head according to a first embodiment of the present invention. FIG. 2 is a partial front view of the thin film magnetic head shown in FIG. 1, as viewed from the surface facing the recording medium, and FIG. 2 shows a first coil piece and second coil piece nearest to a surface facing a recording medium, and the structure of each of layers facing these coil pieces in the thickness direction, except a protruding layer 32, a protecting layer 60, a MR head, etc. FIG. 3 is a partial plan view illustrating the coil structure of the thin film magnetic head shown in FIG. 1, and FIG. 4 is an enlarged partial perspective view showing the structure of a portion of the thin film magnetic head shown in FIG. 1.

In the description below, the X direction shown in the drawings is referred to as "the track width direction", and the Y direction is referred to as "the height direction". Also, the Z direction shown in the drawings corresponds to the direction of movement of the recording medium (magnetic disk). Furthermore, the front end surface (leftmost surface in FIG. 1) of the thin film magnetic head is referred to as "the surface facing the recording medium". The term "the front end surface" of each layer corresponds to the left-hand surface in FIG. 1, and the term "the rear end surface" corresponds to the right-hand surface in FIG. 1.

The thin film magnetic head shown in the drawings comprises a combination of a recording head (referred to as an "inductive head") and a reproducing head (referred to as a "MR head"). However, the thin film magnetic head may comprise only the recording head.

In each of the figures, reference numeral 20 denotes a substrate made of alumina titanium carbide ($Al_2O_3$—TiC) or the like, and an $Al_2O_3$ layer 21 is formed on the substrate 20.

Also, a lower shield layer 22 made of a NiFe alloy or sendust is formed on the $Al_2O_3$ layer 21, and a lower gap layer 23 made of $Al_2O_3$ or the like is formed on the lower shield layer 22.

Furthermore, a magnetoresistive element 24 such as a GMR element comprising a spin-valve thin film element or the like is formed on the lower gap 23 to have a predetermined length from the surface facing the recording medium in the height direction (the Y direction), and electrode layers 25 are formed on both sides of the magnetoresistive element 24 in the track width direction (the X direction) to extend in the height direction (the Y direction).

Furthermore, an upper gap layer 26 made of $Al_2O_3$ or the like is formed on the magnetoresistive element 24 and on the electrode layers 25, and an upper shield layer 27 made of a NiFe alloy or the like is formed on the upper gap layer 26.

The region ranging from the lower shield layer 22 to the upper shield layer 27 is referred to as the "reproducing head (MR head)".

As shown in FIG. 1, a separating layer 28 made of $Al_2O_3$ or the like is formed on the upper shield layer 27. The upper shield layer 27 and the separating layer 28 need not be provided, and a lower core layer 29 may be provided directly on the upper gap layer 26. In this case, the lower core layer 29 also serves as an upper shield layer.

In FIG. 1, the lower core layer 29 is formed on the separating layer 28. The lower core layer 29 is made of a magnetic material such as a NiFe alloy or the like. The lower core layer 29 has a predetermined length from the surface facing the recording medium in the height direction (the Y direction). Furthermore, a nonmagnetic insulating material layer 31 is provided behind the rear end surface 29a of the lower core layer 29 in the height direction and on both sides of the lower core layer 29 in the track width direction (the X direction). As shown in FIG. 1, the surfaces of the lower core layer 29 and the nonmagnetic insulating material layer 31 are formed in a continuous flat surface.

The protruding layer 32 is formed on the lower core layer 29 to have a predetermined length dimension L1 from the surface facing the recording medium in the height direction (the Y direction) (refer to FIG. 4). Furthermore, a back gap layer 33 is formed on the lower core layer 29 at a predetermined distance from the rear end surface 32a of the protruding layer 32 in the height direction (the Y direction).

Each of the protruding layer 32 and the back gap layer 33 is made of a magnetic material, and may be made of the same material as or a different material from that of the lower core layer 29. Also, each of the protruding layer 32 and the back gap layer 33 may comprise a single layer or a multi-layer laminated structure. The protruding layer 32 and the back gap layer 33 are magnetically connected to the lower core layer 29.

As shown in FIG. 1, a coil insulating underlying layer 34 is formed on the lower core layer 29 to be disposed between the protruding layer 32 and the back gap layer 33, and a plurality of first coil pieces 55 extending in the track width direction (the X direction) is formed on the coil insulating underlying layer 34 so as to be parallel to reach other in the height direction. Each of the first coil pieces 55 may be inclined from the track width direction (the X direction) to the height direction.

The first coil pieces 55 are covered with a coil insulating layer 36 made of an inorganic insulating material such as $Al_2O_3$ or the like. As shown in FIG. 1, the upper surfaces of the protruding layer 32, the coil insulating layer 36, and the back gap layer 33 are formed in a continuous flat surface along a reference plane A shown in FIG. 1.

As shown in FIGS. 2 and 3, a connecting layer 61 having conductivity is formed on each of the ends 55a of the first coil pieces 55 in the track width direction (the X direction). As the planar shape (i.e., the sectional shape taken along the X-Y plane) of each connecting layer 61, any one of various shapes such as a circular shape shown in FIG. 3, an elliptical shape, a square shape, a rectangular shape, a rhombic shape, and the like can be selected. The connecting layers 61 may be made of the same material as or different from that of the protruding layer 32 and the back gap layer 33. Also, each of the connecting layers 61 may comprise a single layer structure or a multi-layer laminated structure. The connecting layers 61 are electrically connected to the respective ends 55a of the first coil pieces 55. However, the expression "electrically connected" means that an electric current flows between two layers regardless of whether the connection is direct connection or indirect connection. This applies to the description below.

As shown in FIG. 3, in the first coil piece 55 nearest to the surface facing the recording medium, the connecting layer 61 is provided only on the upper end shown in FIG. 1, while in the other first coil pieces 55, the connecting layers 61 are provided on both ends in the track width direction (the X direction).

As shown in FIG. 2, the upper surfaces 61a of the connecting layers 61 formed on the respective ends 55a of the first coil pieces 55 in the track width direction (the X direction) are coplanar with the reference plane A. Namely, in the thin film magnetic head shown in FIG. 1, all the upper surfaces of the protruding layer 32, the coil insulating layer 36, and the back gap layer 33, and the upper surfaces 61a of the connecting layers 61 are formed in a same flat surface.

As shown in FIG. 1, a Gd-determining layer 38 is formed on the flat surface including the upper surfaces of the protruding layer 32 and the coil insulating layer 36 so that the Gd-determining layer 38 extends from a position at a predetermined distance from the surface facing the recording medium in the height direction.

In the embodiment shown in FIG. 1, the front end surface 38a of the Gd-determining layer 38 is positioned on the protruding layer 32, and the rear end surface 38b is positioned on the coil insulating layer 36.

As shown in FIG. 1, a lower pole sub-layer 39 and a gap sub-layer 40 are formed in turn from below on a front portion of the protruding layer 32 between the surface facing the recording medium and the front end surface 38a of the Gd-determining layer 38, on a rear portion of the coil insulating layer 36 behind the rear end surface 38b of the Gd-determining layer 38 in the height direction, and on the back gap layer 33. The lower pole sub-layer 39 and the gap sub-layer 40 are formed by plating.

As shown in FIG. 1, an upper pole sub-layer 41 serving as a magnetic layer in the present invention is formed by plating on the gap sub-layer 40 and on the Gd-determining layer 38, and an upper core layer 42 is formed by plating on the upper pole sub-layer 41. The upper pole sub-layer 41 is connected directly or indirectly to the lower core layer 29 through the back gap layer 33. In the present invention, the lower pole sub-layer 39, the gap sub-layer 40 and the upper pole sub-layer 41 constitute a laminated structure.

In this embodiment, the four layers including the lower pole sub-layer 39, the gap sub-layer 40, the upper pole sub-layer 41 and the upper core layer 42 constitute a laminate 62.

As shown in FIGS. 1 and 2, a first insulating sub-layer 58 made of an inorganic insulating material, for example, $Al_2O_3$, $SiO_2$, or the like is formed on the top 62a of the laminate 62. The first insulating sub-layer 58 is also formed on the coil insulating layer 36 extending to both sides of the laminate 62 in the track width direction (the X direction).

As shown in FIG. 2, second insulating sub-layers 63 made of an organic insulating material such as resist or the like are formed on both sides 58a of the first insulating sub-layer 58 in the track width direction (the X direction) to further extend beyond both end surfaces 62b of the laminate 62 in the track width direction.

As shown in FIGS. 1 to 3, a plurality of second coil pieces 56 is formed on the insulating layers 58 and 63 so as to be parallel to each other in the height direction and inclined from the track width direction (the X direction) to the height direction (the Y direction). Each of the second coil pieces 56 may extend in parallel with the track width direction (the X direction).

As shown in FIG. 3, the first coil pieces 55 are nonparallel to the second coil pieces 56, and the ends 56a of each of the second coil pieces 56 in the track width direction face, in the thickness direction (the Z direction), the ends 55a of the corresponding first coil piece 55 in the track width direction, so that the left-hand end 55a of each first coil piece 55 shown in FIG. 2 is electrically connected to the left-hand end 56a of the corresponding second coil piece 56 through the connecting layer 61. In FIG. 2, the connecting layer 61 shown by dotted lines on the right-hand side electrically connects the right-hand end of the first coil piece 55 behind (the Y direction) the first coil piece 55 shown in the drawing to the right-hand end 56b of the second coil piece 56 shown in the drawing.

Therefore, in the thin film magnetic head shown in FIG. 1, the first coil pieces 55 face the second coil pieces 56 in the thickness direction with the laminate 62 provided therebetween, and the ends of each first coil piece 55 in the track width direction are electrically connected to the ends of each second coil piece 56 in the track width direction through the connecting layers 61 to form a toroidal coil structure 57.

In FIG. 1, reference numeral 60 denotes a protecting layer made of $Al_2O_3$ or the like, and in FIGS. 1 and 3, reference numeral 59 denotes a lead layer. The lead layer 59 is formed integrally with the rearmost second coil piece 56 in the height direction.

The characteristics of the thin film magnetic head shown in FIG. 1 will be described below.

In the thin film magnetic head shown in FIG. 1, the first insulating sub-layer 58 made of an inorganic insulating material is formed on the upper surface 62a of the laminate 62, as shown in FIGS. 2 and 3. Furthermore, the second insulating sub-layers 63 made of an organic insulating material are formed on both sides 58a of the first insulating sub-layer 58 in the track width direction (the X direction) to further extend beyond both end surfaces 62b of the laminate 62 in the track width direction.

As shown in FIG. 1, therefore, the second insulating sub-layers 63 are not provided on the central portion 58b of the first insulating sub-layer 58 in the track width direction, which is formed on the upper surface 62a of the laminate 62, and in the central portion 58b in the track width direction, the second coil pieces 56 face the laminate 62 through only the first insulating sub-layer 58. Therefore, the upper surface 62a of the laminate 62 is brought near to the lower surfaces of the second coil pieces 56. Thus, a recording magnetic field effectively enters into the laminate 62 from the second coil pieces 56 to effectively improve the magnetization efficiency.

On the other hand, the second insulating sub-layers 63 made of an organic insulating material are formed on both sides 58a of the first insulating sub-layer 58 to further extend beyond both end surfaces 62b of the laminate 62 in the track width direction. Thus, the second insulating sub-layers 63 are necessarily interposed between both end surfaces 62b of the laminate 62 and the second coil pieces 56, thereby sufficiently maintaining insulation between the laminate 62 and the second coil pieces 56.

Next, the formation position of the second insulating sub-layers 63 will be described. The second insulating sub-layers 63 may be formed in a region including at least the formation region of the second coil pieces 56 at least in the height direction (the Y direction) from the surface facing the recording medium. This will be described in detail below with reference to FIG. 3.

In FIG. 3, the formation region of the second insulating sub-layers 63 is shadowed. Although, in FIG. 3, the first insulating sub-layer 58 is omitted (however, the formation position of the first insulating sub-layer 58 is shown by reference numeral), the planar shape of the laminate 62 provided below the first insulating sub-layer 58 is clearly shown instead.

As shown in FIG. 3, the second insulating sub-layers 63 are formed on both ends 58*a* of the first insulating sub-layer 58 within the region where the second coil pieces 56 are formed with intervals in the height direction from the surface facing the recording medium. The laminate 62 (refer to FIG. 4) shown in FIG. 3 comprises a front end portion B in which the dimension at the surface facing the recording medium corresponds to the track width Tw and the width dimension is maintained in the height direction, and a rear end portion C in which the width between both base ends B1 of the front end portion B in the track width direction gradually increases in the height direction. However, as shown in FIG. 3, the second coil pieces 56 are not provided on the front end portion B, and thus the second insulating sub-layers 63 are not provided on the front end portion B. Therefore, the second insulating sub-layers 63 are provided only on the rear end portion C of the laminate 62 where the second coil pieces 56 are formed. The second insulating sub-layers 63 are provided for securing insulation between the second coil pieces 56 and both end surfaces 62*b* of the laminate 62, and it is thus sufficient to provide the second insulating sub-layers 63 only on the rear end portion C of the laminate 62 where at least the second coil pieces 56 are formed.

The average distance H1 (the average distance between the bottoms of the second insulating sub-layers 63 in the track width direction) (refer to FIGS. 2 and 3) between the second insulating sub-layers 63 provided on both sides 58*a* of the first insulating sub-layer 58 in the track width direction (the X direction) defines an area where only the first insulating sub-layer 58 is interposed between the second coil pieces 56 and the laminate 62. Therefore, in order to improve the magnetization efficiency, the average distance H1 is preferably larger than the track width Tw. More specifically, in the rear end portion C of the laminate 62 shown in FIG. 2, the average width H2 between both end surfaces 62*b* of the laminate 62 in the track width direction (the average distance between the boundaries between the upper surface 62*a* and both end surfaces 62*b* of the laminate 62 in the track width direction within the region from the front end surface of the second coil piece 56 nearest to the surface facing the recording medium to the rear end surface of the rearmost second coil piece 56 in the height direction) is in the range of 5 to 20 μm. The average width H3 of the second insulating sub-layers 63 deposited on both sides 58*a* in the track width direction (the average width between the boundary between the inner end of each second insulating sub-layer 63 and its lower surface and the boundary between the upper surface 62*a* of the laminate 62 and each end surface 62*b* in the track width direction) is in the range of 1 to 5 μm, and the average distance H1 is in the range of 3 to 18 μm.

As shown in FIG. 3, the second coil pieces 56 are provided on the rear end portion C of the laminate 62, not provided on the front end portion B. If the second coil pieces 56 are provided on the front end portion B, the second insulating sub-layer 63 must be provided on the front end portion B, and thus the average distance H1 between the second insulating sub-layers 63 becomes smaller than the track width Tw on the front end portion B, thereby easily decreasing the magnetization efficiency. Therefore, as shown in FIG. 3, the rear end portion C having a wider area than that of the front end portion B is preferably effectively used for providing the second coil pieces 56 on the rear end portion C, and the second insulating sub-layers 63 are preferably partially provided on the rear end portion C, for increasing the average distance H1 between the second insulating sub-layers 63 and improving the magnetization efficiency.

As described above, the first insulating sub-layer 58 is made of an inorganic insulating material such as $Al_2O_3$ or the like, and the second insulating sub-layers 63 are made of an organic insulating material such as resist or the like. The first insulating sub-layer 58 is formed by sputtering deposition. The first insulating sub-layer 58 is actually formed by sputtering deposition not only on the upper surface 62*a* of the laminate 62 but also on the upper surface of the coil insulating layer 36 extending to both sides of the laminate 62 in the track width direction (the X direction). Since the first insulating sub-layer 58 is formed by sputtering deposition of an inorganic insulating material, the first insulating sub-layer 58 can easily be formed to a small thickness T1 (refer to FIG. 2). For example, the thickness T1 is preferably 0.2 to 1.0 μm. Therefore, in the region where only the first insulating sub-layer 58 is interposed, the distance between the upper surface 62*a* of the laminate 62 and the lower surface of each second coil piece 56 is effectively decreased to improve the magnetization efficiency. Also, the thickness of the first insulating sub-layer 58 formed on the upper surface 62*a* of the laminate 62 can easily be controlled to secure a small thickness T1 sufficient to prevent the occurrence of pinholes, thereby easily sufficiently maintaining insulation between the upper surface 62*a* of the laminate 62 and the lower surface of each second coil piece 56.

On the other hand, the second insulating sub-layers 63 made of an organic insulating material are formed by coating resist or the like having high viscosity, and thus both end surfaces 62*b* of the laminate 62, to which the first insulating sub-layer 58 does not sufficiently adheres, can be completely covered with the second insulating sub-layers 63. After coating, the second insulating sub-layers 63 made of the resist or the like are cured by a heat treatment or the like to completely coat the second insulating sub-layers 63 on both ends 58*a* of the first insulating sub-layer 58 and on both end surfaces 62*b* of the laminate 62.

The average thickness T2 of the second insulating sub-layers 63 formed on both sides 58*a* of the first insulating sub-layer 58 is preferably larger than the average thickness T1 of the first insulating sub-layer 58. The average thickness T2 of the second insulating sub-layers 63 is preferably in the range of 0.3 to 3 μm. When the average thicknesses T1 and T2 of the first and second insulating sub-layers 58 and 63 are controlled as described above, the upper surface 62*a* of the laminate 62 can be brought nearer to the lower surfaces of the second coil pieces 56 to improve the magnetization efficiency and improve the insulation between both end surfaces 62b of the laminate 62 and the second coil pieces 56.

The second insulating sub-layers 63 may be partially provided only on both end surfaces 62b of the laminate 62 for securing insulation between both end surfaces 62b of the laminate 62 and the second coil pieces 56. However, in order to completely cover both end surfaces 62b of the laminate 62, the second insulating sub-layers 63 are preferably deposited on both sides 58a of the first insulating sub-layer 58. Also, when the second insulating sub-layers 63 are not sufficiently provided to fail to completely cover both end surfaces 62b of the laminate 62, sharp steps easily occur between the upper surfaces of the second insulating sub-layers 63 and the upper surface of the first insulating sub-layer 58 formed on the upper surface 62a of the laminate 62, thereby causing a problem in which the second coil pieces 56 cannot be formed in a predetermined pattern. Therefore, in the present invention, the second insulating sub-layers 63 are provided on both sides 58a of the first insulating sub-layer 58 formed on the laminate 62 in such a manner that the second insulating sub-layers 63 extend beyond both end surfaces 62b of the laminate 62 in the track width direction.

As described above, the laminate 62 comprises the front end portion B in which the width dimension at the surface facing the recording medium corresponds to the track width Tw, and the width dimension is maintained in the height direction, and the rear end portion C in which the width dimension between both base ends B1 of the front end portion B in the track width direction gradually increases in the height direction. FIG. 4 is a perspective view of the laminate 62.

The front end portion B may have a shape in which the width dimension in the track width direction gradually increases from the surface facing the recording medium in the height direction. In this case, in the rear end portion C, the width dimension between both base ends B1 of the front end portion B in the track width direction further increases in the height direction.

As shown in FIG. 4, the gap depth (Gd) is determined by the length of the upper surface 40a of the gap sub-layer 40 from the surface facing the recording medium to the front end of the Gd-determining layer 38 in the height direction (the Y direction shown in the drawing).

As shown in FIGS. 1 to 4, the laminate 62 may have a four-layer structure in which the lower pole sub-layer 39, the gap sub-layer 40, the upper pole sub-layer 41 and the upper core layer 42 are laminated in turn from below, or a three-layer structure in which the lower pole sub-layer 39, the gap sub-layer 40 and the upper pole sub-layer 41 are laminated in turn from below.

The lower pole sub-layer 39, the gap sub-layer 40, the upper pole sub-layer 41 and the upper core layer 42 have a same planar shape. Therefore, the upper pole sub-layer 41 comprises a front end portion B in which the width dimension at the surface facing the recording medium corresponds to the track width Tw, and the width dimension is maintained in the height direction, and a rear end portion C in which the width dimension between both base ends B1 of the front end portion B in the track width direction increases in the height direction.

Figure 5:
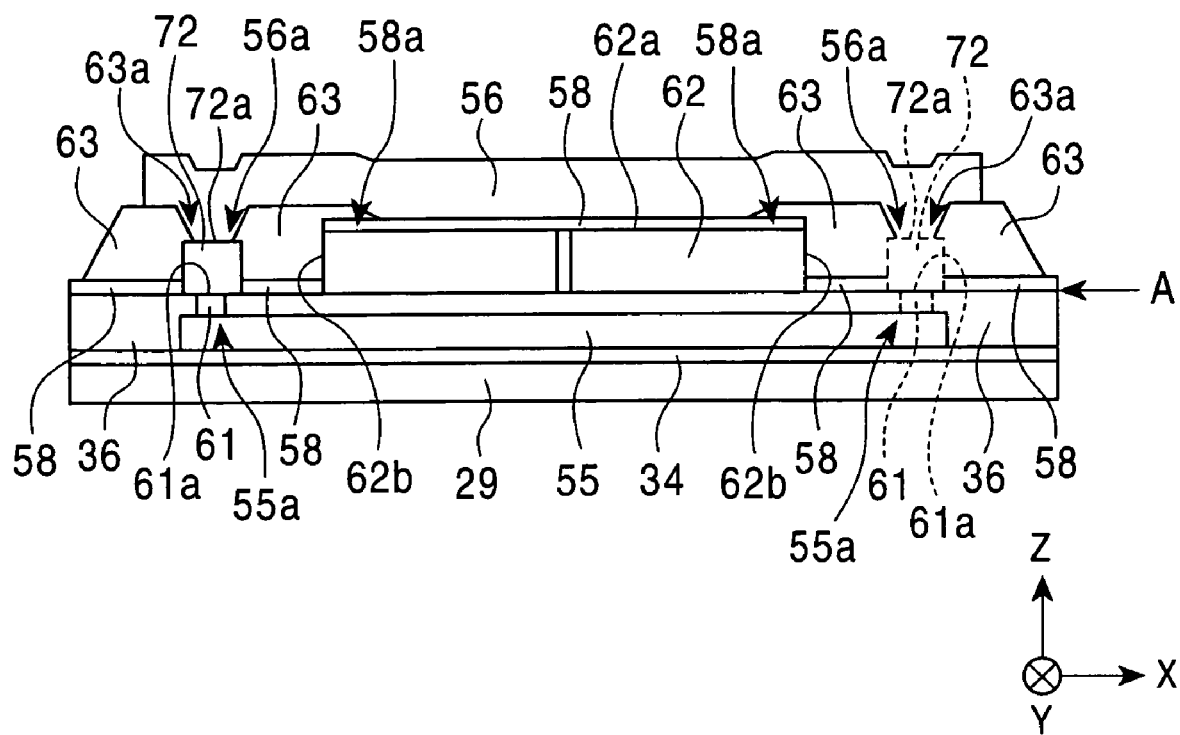
FIG. 5 is a partial front view showing the structure of a thin film magnetic head according to a second embodiment of the present invention.

FIG. 5 is a partial front view a thin film magnetic according to a second embodiment of the present invention, as viewed from the surface facing the recording medium, and shows a first coil piece and second coil piece nearest to a surface facing a recording medium, etc. except a protruding layer 32, a protective layer 60, a MR head, etc. The same reference numerals as in FIG. 2 denote the same layers as those shown in FIG. 2.

In FIG. 5, the portion ranging from the lower core layer 29 to the coil insulating layer 36 is the same as in FIG. 2. Namely, the plurality of first coil pieces 55 is provided in the space surrounded by the lower core layer 29, the protruding layer 32 and the back gap layer 33, and the upper surfaces 61a of the connecting layers 61 formed as projections on the respective ends 55a of each first coil piece 55 in the track width direction (the X direction) are coplanar with the upper surfaces of the protruding layer 32, the coil insulating layer 36 and the back gap layer 33.

As shown in FIG. 5, rising layers 72 are formed on the coil insulating layer 36 on both sides of the laminate 62 in the track width direction (the X direction). The rising layers 72 are conductive and are formed on the respective connecting layers 61, as shown in FIG. 5. The rising layers 72 are electrically connected to the upper surfaces of the respective connecting layers 61.

As shown in FIG. 5, the first insulating sub-layer 58 made of an inorganic insulating material such as $Al_2O_3$ or the like is formed on the upper surface 62a of the laminate 62, and the second insulating sub-layers 63 made of an organic insulating material such as resist or the like are formed on both sides 58a of the first insulating sub-layer 58 in the track width direction (the X direction) to extend beyond both end surfaces 62b of the laminate 62. As shown in FIG. 5, the second insulating sub-layers 63 are also formed around the rising layers 72.

As shown in FIG. 5, the second insulating sub-layers 63 are also coated on both ends of the upper surface 72a of each rising layers 72 in the track width direction (the X direction), but not provided on the central portion of the upper surface 72a of each rising layer 72. Also, the second insulating sub-layers 63 have holes 63a at the centers of the upper surfaces 72a of the respective rising layers 72. The holes 63a are formed by exposure and development after the second insulating sub-layers 63 are formed by coating the resist over the entire upper surfaces of the rising layers 72.

As shown in FIG. 5, the ends 56a of each second coil piece 56 in the track width direction (the X direction) are formed to pass through the holes 63a formed in the insulating layers 63 at the upper surfaces 72a of the respective rising layers 72 so that the ends 56a of each second coil piece 56 are electrically connected to the rising layers 72.

Like in the thin film magnetic head shown in FIG. 2, in the thin film magnetic head shown in FIG. 5, the first insulating sub-layer 58 made of an inorganic insulating material is formed on the upper surface 62 of the laminate 62, and the second insulating sub-layers 63 made of an organic insulating material are formed on both sides 58a of the first insulating sub-layer 58 in the track width direction (the X direction) to extend beyond both end surfaces 62b of the laminate 62 in the track width direction.

Therefore, as shown in FIG. 5, the second insulating sub-layers 63 are not provided on the central portion 58b of the first insulating sub-layer 58 in the track width direction, which is formed on the upper surface 62a of the laminate 62, and in the central portion in the track width direction, the laminate 62 thus faces the second coil pieces 56 with only the first insulating sub-layer 58 provided therebetween to bring the laminate 62 near to the second coil pieces 56. Therefore, a recording magnetic field effectively enters into the magnetic layer 62 from the second coil pieces 56, and thus the magnetization efficiency can be effectively improved.

On the other hand, the second insulating sub-layers 63 made of an organic insulating material are formed on both sides 58*a* of the first insulating sub-layer 58 to extend beyond both end surfaces 62*b* of the laminate 62 in the track width direction. Therefore, the second insulating sub-layers 63 are necessarily interposed between both end surfaces 62*b* of the laminate 62 and the second coil pieces 56, sufficiently maintaining insulation between the laminate 62 and the second coil pieces 56.

In FIG. 5, the rising layers 72 are provided on both sides of the laminate 62 in the track width direction apart from the connecting layers 61, and the spaces between the laminate 62 and the rising layers 72 in the track width direction are filled with the second insulating sub-layers 63. Therefore, the formation positions of the ends 56*a* of the second coil pieces 56 are raised to more sufficiently maintain insulation between the second coil pieces 56 and both end surfaces 62*b* of the laminate 62, as compared with the embodiment shown in FIG. 2. Also, the surfaces of the first insulating sub-layer 58 and the second insulating sub-layers 63, on which the second coil pieces 56 are formed, become more flattened than in the embodiment shown in FIG. 2, and thus the second coil pieces 56 can be more precisely formed in a pattern.

Figure 6:
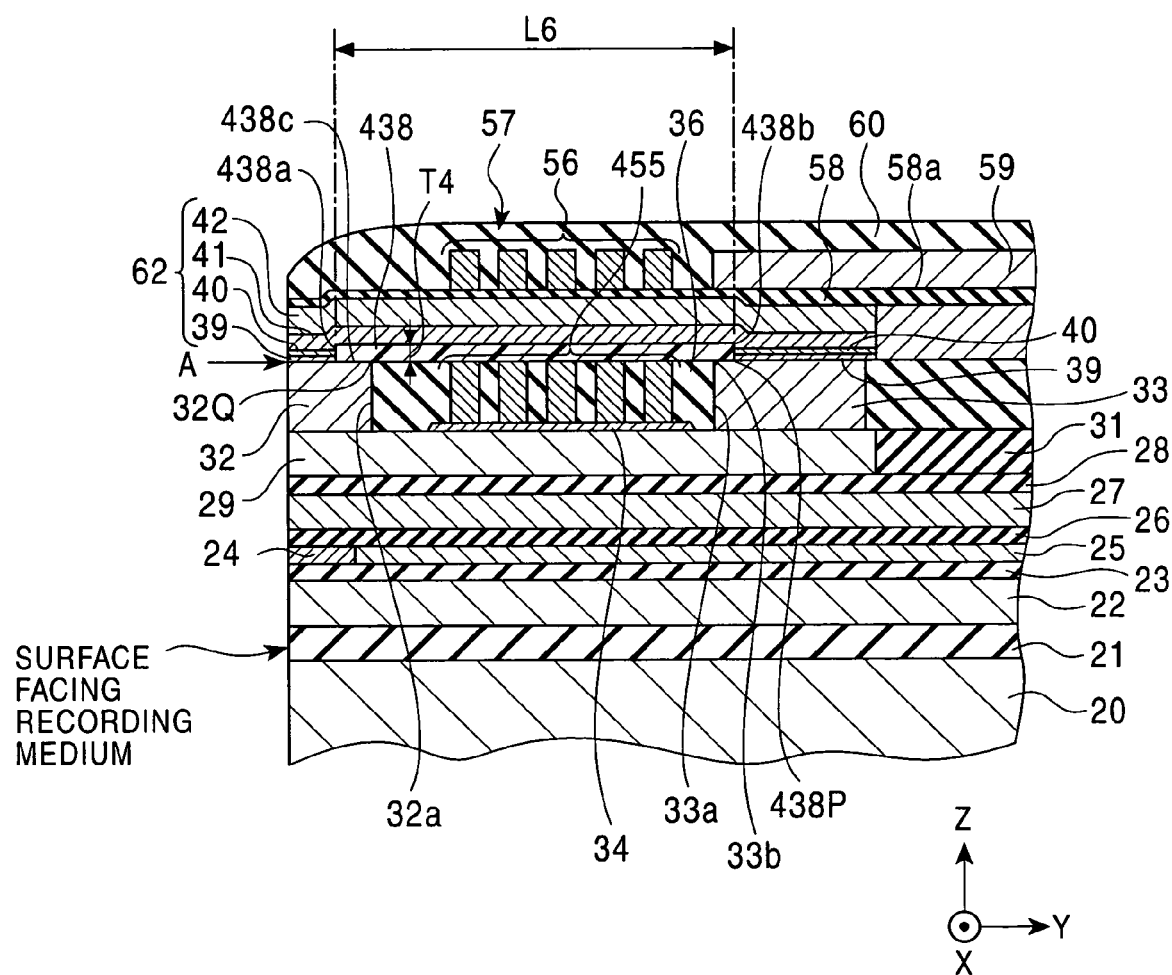
FIG. 6 is a longitudinal sectional view showing the structure of a thin film magnetic head according to a third embodiment of the present invention.

FIG. 6 is a longitudinal partial sectional view showing the structure of a thin film magnetic head according to a third embodiment of the present invention. The thin film magnetic head shown in FIG. 6 has substantially the same structure as that of the thin film magnetic head shown in FIG. 1. In the thin film magnetic head shown in FIG. 6, the same components as those of the thin film magnetic head shown in FIG. 1 are denoted by the same reference numerals as in FIG. 1, and the detailed description thereof is omitted.

In the thin film magnetic head shown in FIG. 6, the upper surfaces of first coil pieces 455 are coplanar with a reference plane A shown in FIG. 6, and the upper surfaces of the protruding layer 32, the first coil pieces 455, the coil insulating layer 36 and the back gap layer 33 are formed in a continuous flat surface along the reference plane A.

Also, a Gd-determining layer 438 is formed on the flat surface to extend from a position at a predetermined distance from the surface facing the recording medium in the height direction (the Y direction shown in the drawing). Like in the thin film magnetic head shown in FIG. 1, the front end surface 438*a* of the Gd-determining layer 438 is positioned on the protruding layer 32, and the rear end surface 438*b* of the Gd-determining layer 438 is positioned on the back gap layer 33. The rear end surface 438*b* of the Gd-determining layer 438 may be positioned on the boundary 33*b* between the upper surface of the back gap layer 33 and its front end surface 33*a*.

In the thin film magnetic head shown in FIG. 6, the Gd-determining layer 438 is formed on the first coil pieces 455, the Gd-determining layer 438 being made of an organic or inorganic insulating material. Therefore, even when the first coil pieces 455 are extended upward to the reference plane A so as to make contact with the lower surface 438*c* of the Gd-determining layer 438, the first coil pieces 455 can be insulated from the laminate 62. Therefore, the sectional area of the first coil pieces 455 can be increased to decrease the resistance.

Figure 7:
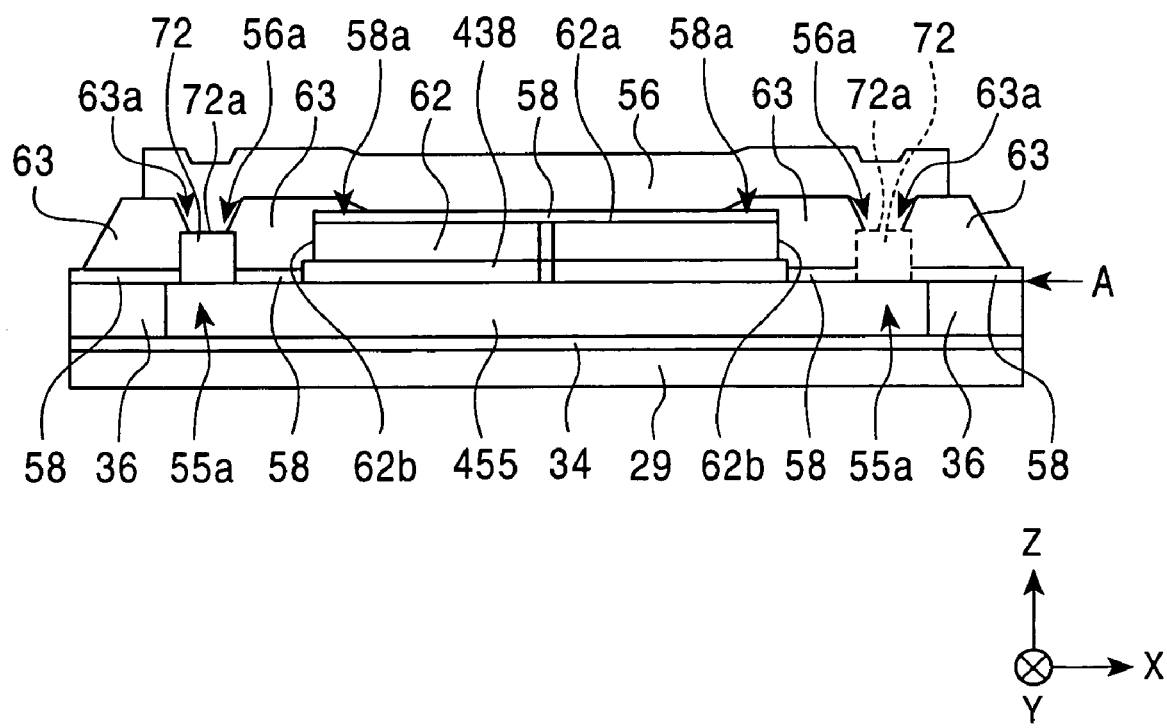
FIG. 7 is a partial front view showing the structure of the thin film magnetic head shown in FIG. 6.

FIG. 7 is a front view of the thin film magnetic head shown in FIG. 6, as viewed from the surface facing the recording medium. FIG. 7 shows the first coil piece 455 behind the protruding layer 32, not the protruding layer 32.

In this embodiment, the upper surfaces of the first coil pieces 455 are placed in a flat surface along the reference plane A, which is coplanar with the upper surfaces of the protruding layer 32, the coil insulating layer 36, and the back gap layer 33. In this case, the first coil pieces 455 can be connected directly to the rising layers 72. Therefore, unlike in the thin film magnetic head shown in FIG. 5, the connecting layers 61 for connecting the first coil pieces 34 to the rising layers 72 can be omitted to decrease the number of connecting portions, thereby decreasing the resistance of the whole coil layer. Therefore, in the thin film magnetic head, the quantity of the heat generated is also decreased to decrease the amount of thermal expansion or projection of the surface facing the recording medium, thereby providing a magnetic head with a small flying amount.

In this embodiment, the second coil pieces 56 may be connected directly to the first coil pieces 455 without the rising layers 72.

In the present invention, the coil layer is not limited to the coil layer shown in FIG. 3 which comprises the plurality of parallel first coil pieces 55, and the plurality of parallel second coil pieces 56.

Namely, in the present invention, the first coil pieces may be formed in the space surrounded by the lower core layer 29, the protruding layer 32 and the back gap layer 33 to extend in a direction crossing the laminate 62, and the second coil layers may be formed to cross the laminate 62 so that the ends of the adjacent first coil pieces are connected to each other through the second coil pieces to form the toroidally wound coil layer.

Each of FIGS. 8 to 12 is a plan view showing a planar structure of first and second coil pieces, which can be applied to the thin film magnetic head of the present invention.

Figure 8:
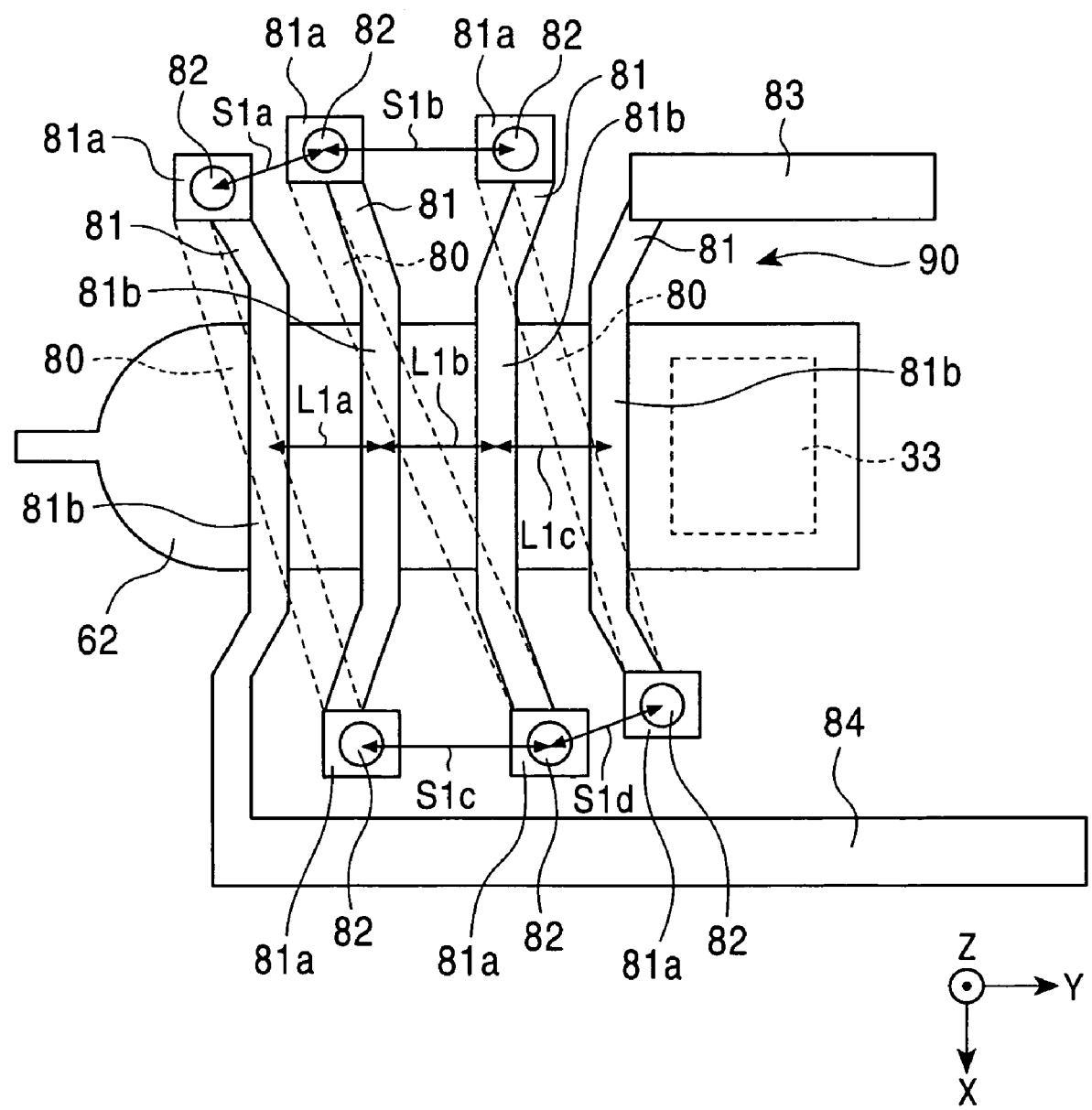
FIG. 8 is a partial plan view showing the coil shape of a coil layer of a thin film magnetic head according to the present invention.

FIG. 8 shows only a laminate 62 and a coil layer 90 of a thin film magnetic head. The thin film magnetic head shown in FIG. 8 has substantially the same structure as that of the thin film magnetic head shown in FIG. 1 except the structure of the coil layer.

Namely, in the thin film magnetic head shown in FIG. 8, a plurality of first coil pieces 80 constituting the coil layer 90 are not parallel to each other, and a plurality of second coil pieces 81 has parallel portions 81*b* overlapping with the laminate 62, and portions inclined so that the distance between adjacent portions in the height direction (the Y direction) increases toward the ends 81*a* on both sides of the laminate 62 in the track width direction (the X direction shown in the drawing).

In FIG. 8, the first coil pieces 80 formed below the laminate 62 are shown by dotted lines, and the second coil pieces 81 formed on the laminate 62 are shown by solid lines.

Like in the structure shown in FIG. 5, rising layers 82 with conductivity are formed on the respective ends 81*a* of each second coil piece 81 in the track width direction (the X direction), and the rising layers 82 are electrically connected to the respective ends of each first coil piece 80. Although not shown in FIG. 8, the ends of each first coil piece 80 are formed to overlap with the ends 81*a* of each second coil piece 81. The rising layers 82 have the same structure as that of the rising layers 72 shown in FIG. 5, and are connected to the respective ends of each first coil piece 80 through the same connecting layers as the connecting layers 61. The coil layer 90 shown in FIG. 8 has a structure in which it is toroidally wound around the laminate 62. In FIG. 8, reference numerals 83 and 84 denote lead layers for connecting both ends of the coil layer 90 to an electrode layer.

In FIG. 8, for example, the distance S1*a* between the ends 81*a* of the leftmost second coil piece 81 and its right-hand neighbor second coil piece 81 in the drawing is larger than the minimum distance L1$a$ between these second coil pieces 81 in the region where the second coil pieces 81 overlap with the laminate 62.

Also, the distances S1$b$ and S1$c$ between the ends 81$a$ of the second coil piece 81, which is the second from the left side, and its right-hand neighbor second coil piece 81 in the drawing are larger than the minimum distance L1$b$ between these second coil pieces 81 in the region where the second coil pieces 81 overlap with the laminate 62. Furthermore, the distance S1$d$ between the ends 81$a$ of the rightmost second coil piece 81 and its left-hand neighbor second coil piece 81 in the drawing is larger than the minimum distance L1$c$ between the second coil pieces 81 in the region where the second coil pieces 81 overlap with the laminate 62.

The distance between the ends 81$a$ is the distance between the centers of the ends 81$a$. The minimum distance of the second coil pieces 81 in the region where the second coil pieces 81 overlap with the laminate 62 is the minimum distance between the lines each of which divides a second coil piece into two equal parts.

In an inductive thin film magnetic head, the volume of a magnetic circuit through which a magnetic flux flows is preferably decreased to decrease inductance. Therefore, the length of the laminate 62 in the height direction must be decreased to decrease the distances L1$a$, L1$b$ and L1$c$ between the adjacent second coil pieces 81 in the region where the second coil pieces 81 overlap with the laminate 62. In the present invention, the distance between the adjacent ends 81$a$ of the second coil pieces 81 in the height direction becomes large as described above to facilitate the formation of the ends 81$a$, and thus the ends of the first coil pieces 80 can be easily and securely connected to the ends 81$a$ of the first coil pieces 81.

Also, the plurality of second coil pieces 81 has the parallel portions 81$b$ extending in the track width direction in the drawing within the region where the second coil pieces 81 overlap with the laminate 62. Therefore, a magnetic field induced into the laminate 62 from the coil layer 90 is stabilized.

In the structure of the coil layer 90 shown in FIG. 8, the plurality of second coil pieces 81 are parallel to each other over the entire region where the second coil pieces 81 overlap with the laminate 62. However, even when the plurality of second coil pieces 81 has portions 81$b$ parallel to each other in a portion of the region where the second coil pieces 81 overlap with the laminate 62, as shown in FIG. 9, the effect of stabilizing a magnetic field induced into the laminate 62 from the coil layer 90 can be exhibited.

In the present invention, the distance between the adjacent ends 81$a$ of at least one pair of the second coil pieces in the height direction may be larger than the minimum distance between the second coil pieces 81 in the region where the second coil pieces 81 overlap with the laminate 62.

Figure 10:
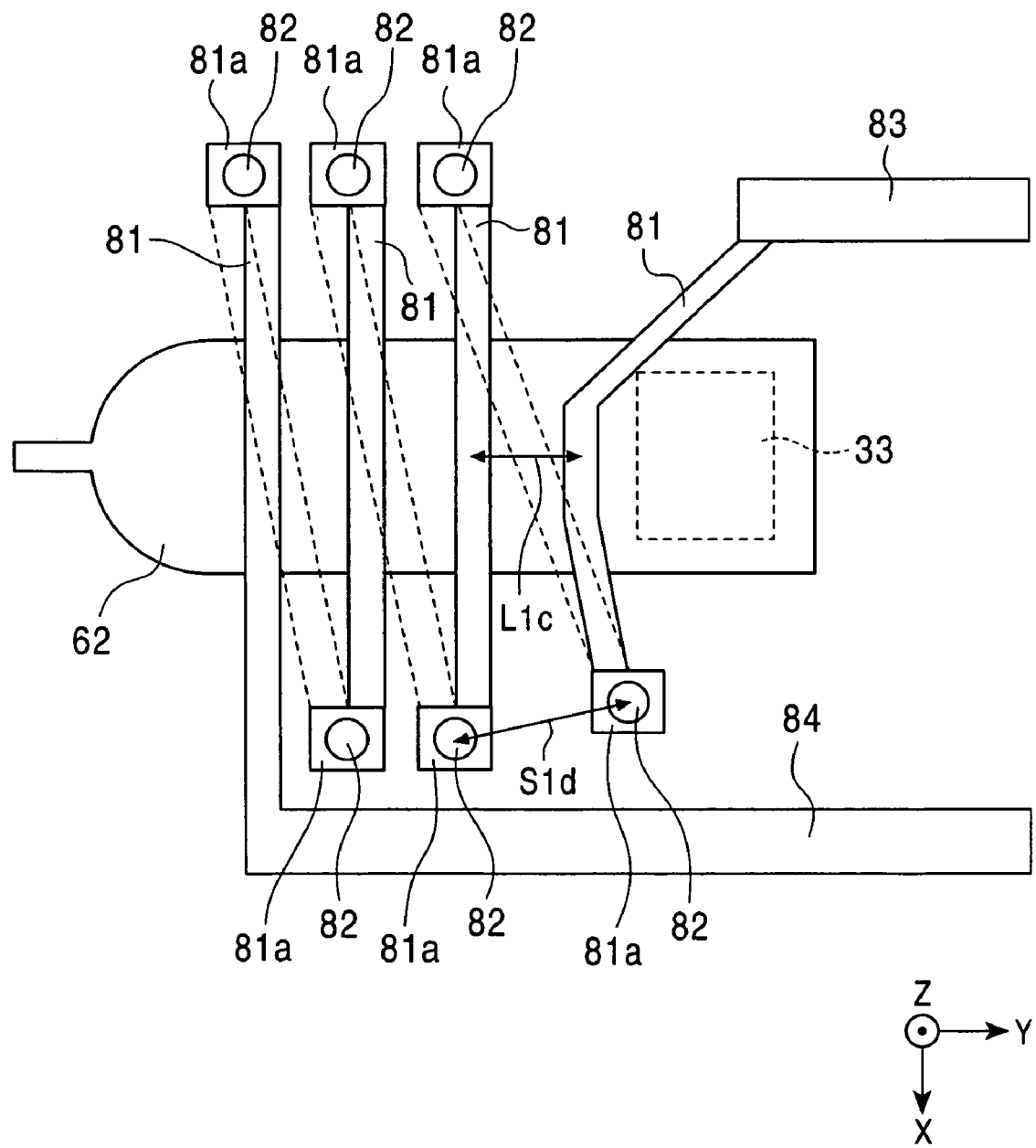
FIG. 10 is a partial plan view showing the coil shape of a coil layer of a thin film magnetic head according to the present invention.

For example, the scope of the present invention includes the structure of a coil layer shown in FIG. 10. In FIG. 10, only the distance S1$d$ between the ends 81$a$ of the rightmost second coil piece 81 and its left-hand neighbor second coil piece 81 in the drawing is larger than the minimum distance L1$c$ between the second coil pieces 81 in the region where the second coil pieces 81 overlap with the laminate 62. However, the distance between the adjacent ends 81$a$ of any other combination of the second coil pieces 81 in the height direction is equal to the minimum distance between the second coil pieces 81 in the region where the second coil pieces 81 overlap with the laminate 62.

Figure 9:
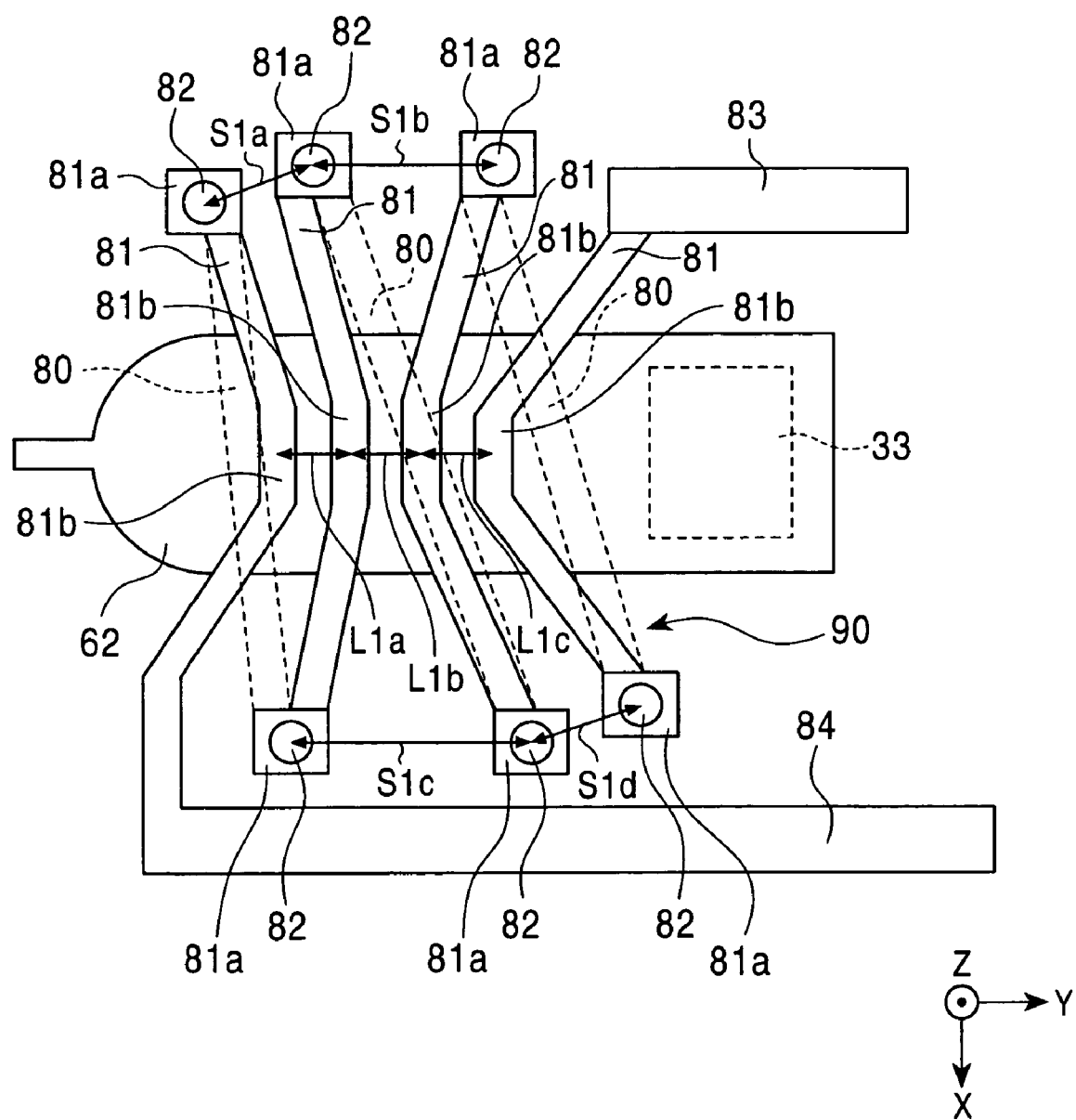
FIG. 9 is a partial plan view showing the coil shape of a coil layer of a thin film magnetic head according to the present invention.

Although, in FIGS. 8 to 10, the distance between the adjacent second coil pieces 81 increases from the region where the second coil pieces 81 overlap with the laminate 62 to the ends 81$a$, the same structure can be applied to the first coil pieces 80.

Figure 11:
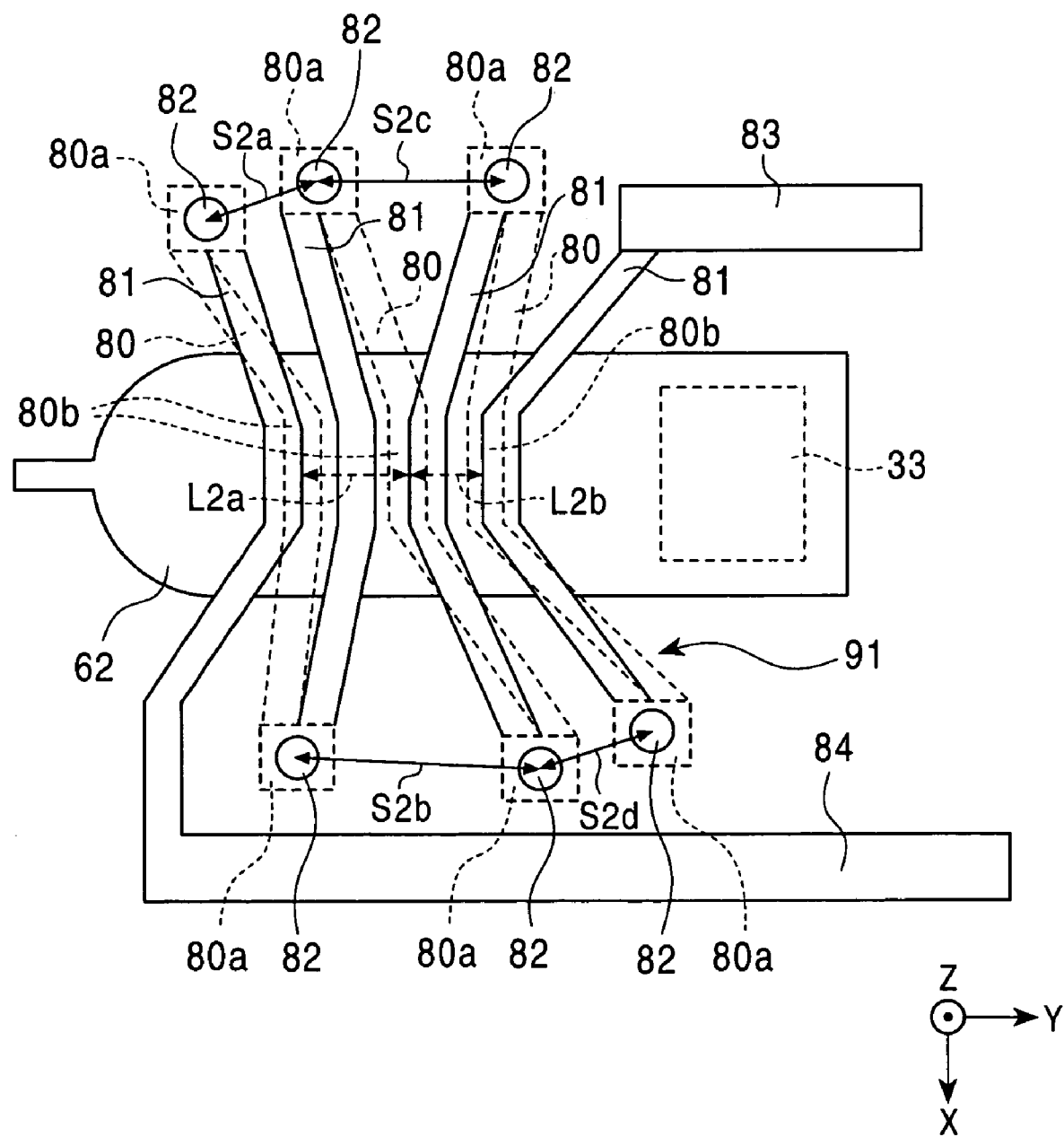
FIG. 11 is a partial plan view showing the coil shape of a coil layer of a thin film magnetic head according to the present invention.

FIG. 11 shows a coil layer 91 having a structure in which the distance between the adjacent first coil pieces 80 increases from the region where the first coil pieces 80 overlap with the laminate 62 to the ends 80$a$ of the first coil pieces 80.

The second coil pieces 81 of the coil layer 91 shown in FIG. 11 have the same structure as that of the coil layer 90 shown in FIG. 9. FIG. 11 shows the ends 80$a$ of the first coil pieces 80 not shown in FIG. 9, and the ends 81$a$ of the second coil pieces 81 are omitted.

In FIG. 11, for example, the distances S2$a$ and S2$b$ between the ends 80$a$ of the leftmost first coil piece 80 and its right-hand neighbor first coil piece 80 in the drawing are larger than the minimum distance L2$a$ between these first coil pieces 80 in the region where the first coil pieces 80 overlap with the laminate 62.

Also, the distances S2$c$ and S2$d$ between the ends 80$a$ of the first coil piece 80, which is the second (central) from the left, and its right-hand neighbor first coil piece 80 (rightmost) in the drawing are larger than the minimum distance L2$b$ between these first coil pieces 80 in the region where the first coil pieces 80 overlap with the laminate 62.

The distance between the ends 80$a$ is the distance between the centers of the ends 80$a$. The minimum distance of the first coil pieces 80 in the region where the first coil pieces 80 overlap with the laminate 62 is the minimum distance between the lines each of which divides a first coil piece into two equal parts.

Also, the plurality of first coil pieces 80 has the parallel portions 80 extending in the track width direction in the drawing within the region where the first coil pieces 80 overlap with the laminate 62. Therefore, a magnetic field induced into the laminate 62 from the coil layer 91 is stabilized.

The structure of the first coil pieces 80 is not limited to the structure shown in FIG. 11. For example, the first coil pieces 80 may be formed in a structure similar to that of the second coil pieces 81 shown in FIG. 8 or 10.

The scope of the present invention includes a structure in which only the first coil pieces have the structure of the present invention, i.e., the structure in which the distance between at least one pair of the first coil pieces 80 increases from the region where the first coil pieces 80 overlap with the laminate 62 to the ends of the first coil pieces 80.

Figure 12:
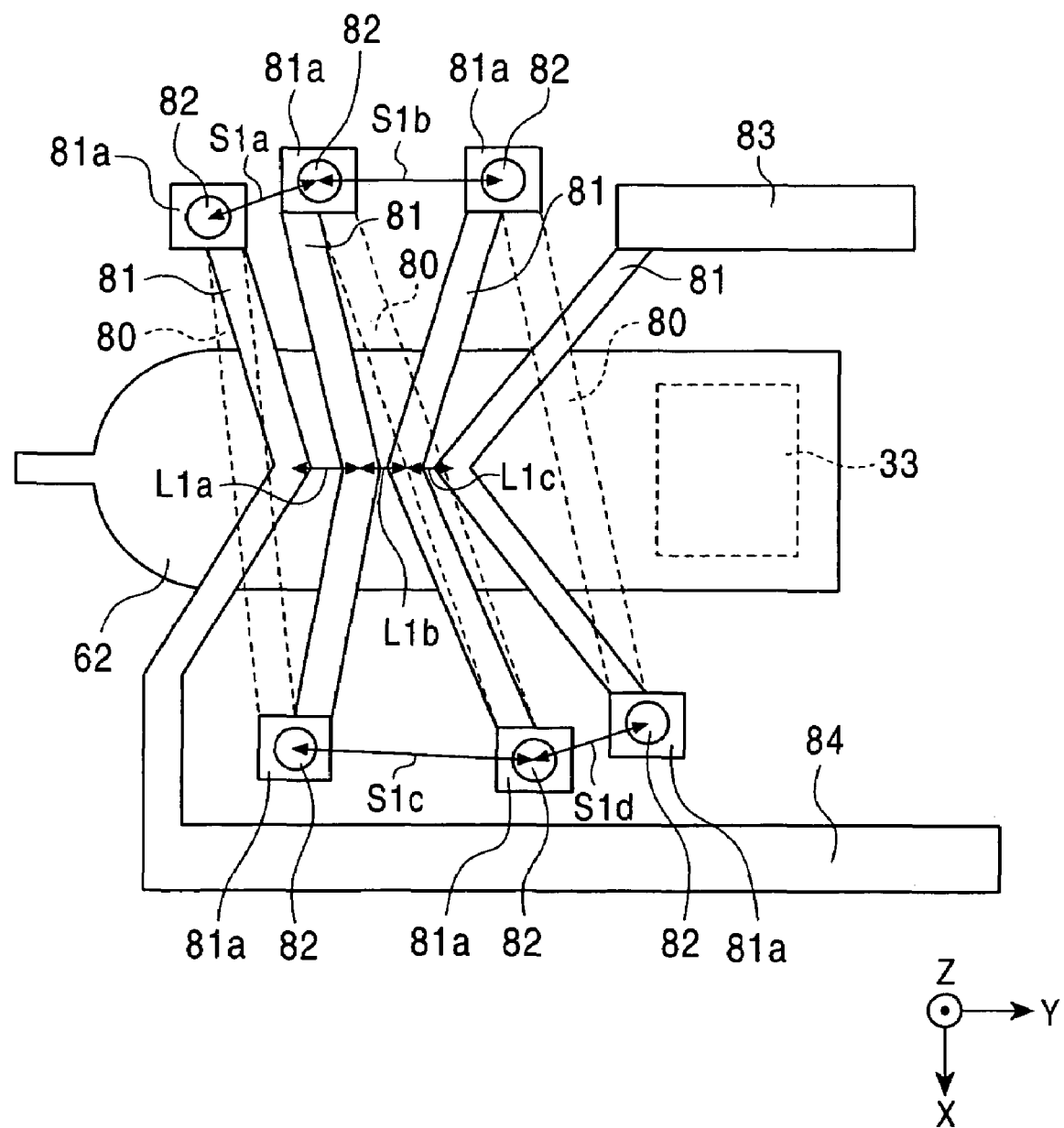
FIG. 12 is a partial plan view showing the coil shape of a coil layer of a thin film magnetic head according to the present invention.

As shown in FIG. 12, a coil layer 92 may be formed to have no parallel portion in the region where the coil layer 92 overlaps with the laminate 62.

Figure 13:
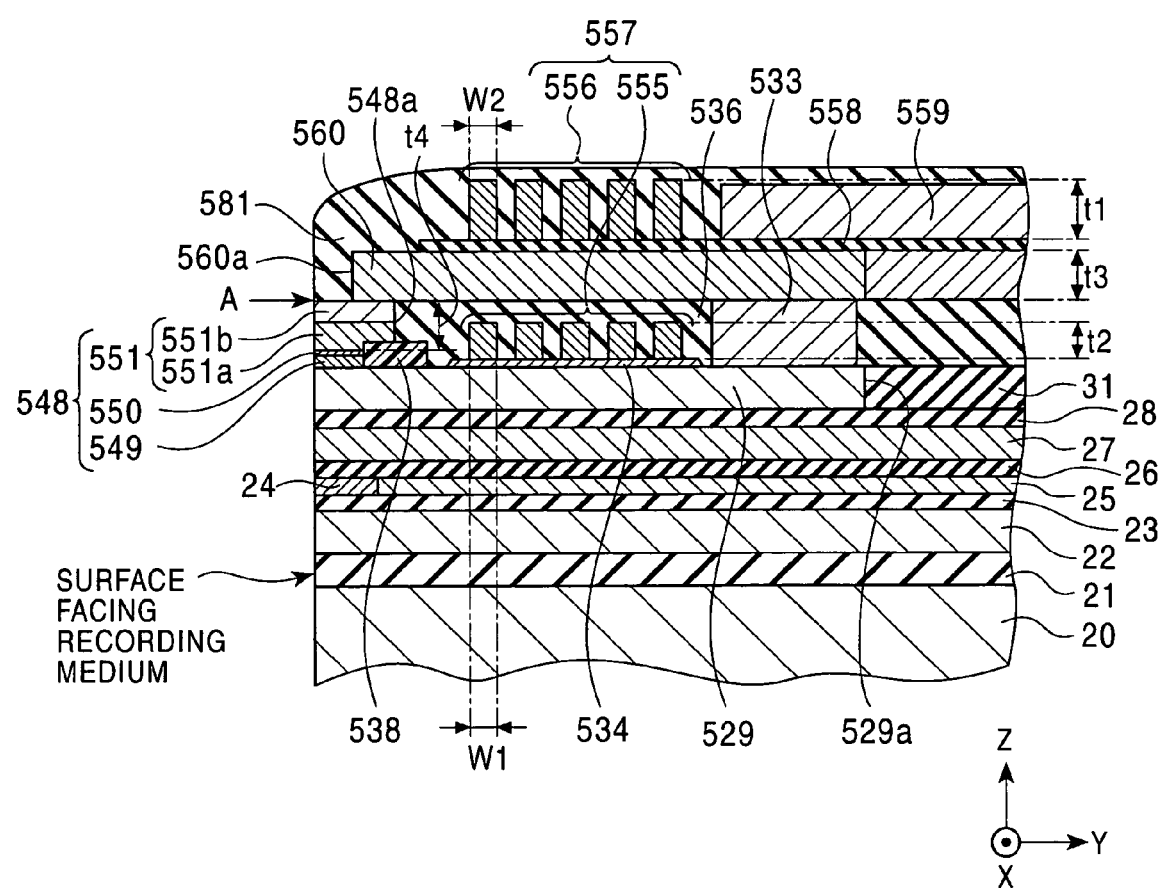
FIG. 13 is a longitudinal sectional view showing the structure of a thin film magnetic head according to a fourth embodiment of the present invention.
Figure 14:
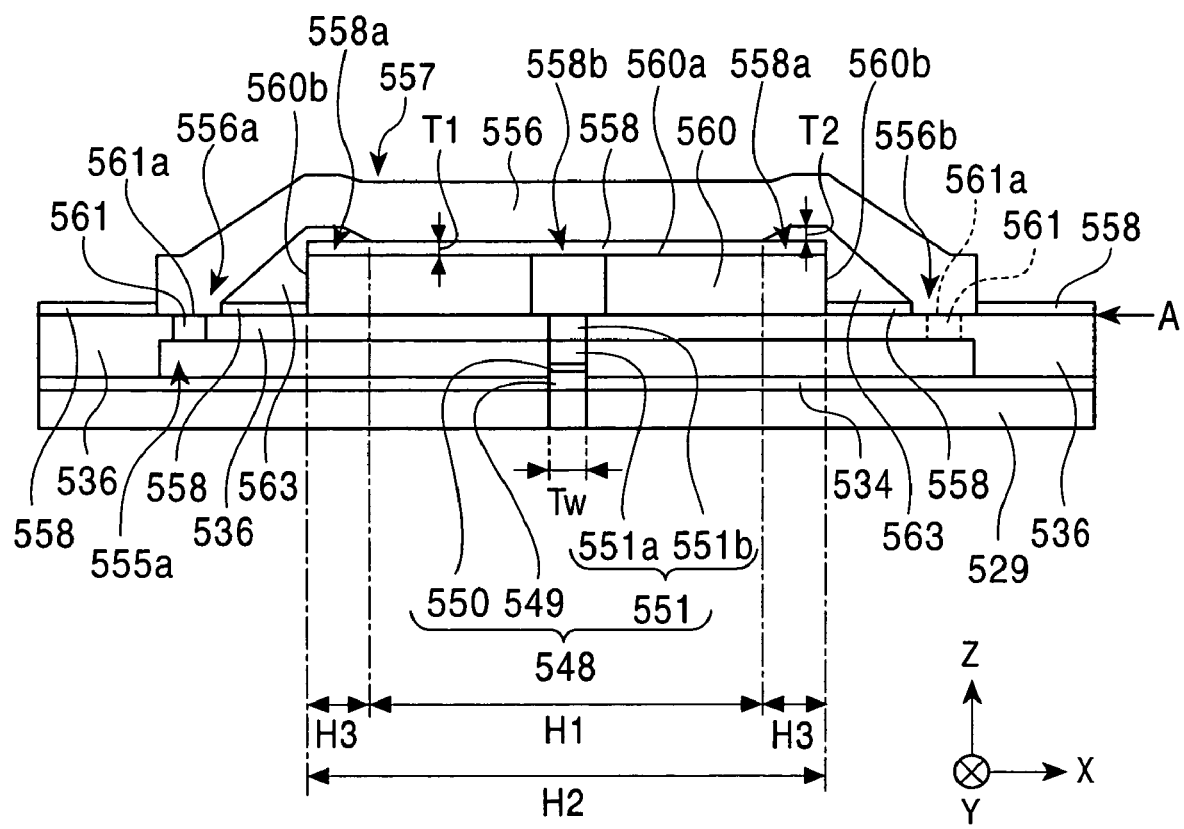
FIG. 14 is a partial front view showing the thin film magnetic head shown in FIG. 13.

FIG. 13 is a longitudinal partial sectional view of the structure of a thin film magnetic head according to a fourth embodiment of the present invention. FIG. 14 is a partial front view of the thin film magnetic head shown in FIG. 13, as viewed from the surface facing the recording medium, and shows a pole tip layer, first and second coil pieces nearest to the surface facing the recording medium, and layers facing these coil layers in the thickness direction, except a MR head, an insulating layer 536 and a protecting layer 561.

The reproducing head (referred to as a "MR head") ranging from the lower shield layer 22 to the upper shield layer 27 is the same as that of the thin film magnetic head according to any one of the first to fifth embodiments.

As shown in FIG. 13, a separating layer 28 made of Al2O3 or the like is formed on the upper shield layer 27. Also, a lower core layer 529 may be provided on the upper gap layer 26 without the upper shield layer 27 and the separating layer 28. In this case, the lower core layer 529 also servers as an upper shield layer.

In FIG. 13, the lower core layer 529 is formed on the separating layer 28. The lower core layer 529 is made of a magnetic material such as a NiFe alloy or the like. The lower core layer 529 is formed to have a predetermined length in the height direction (the Y direction shown in the drawing) from the surface facing the recording medium. Furthermore, a nonmagnetic insulating material layer 31 is formed on a rear portion behind the rear end 529a of the lower core layer 529 in the height direction and on both sides of the lower core layer 529 in the track width direction (the X direction shown in the drawing). As shown in FIG. 13, the surfaces of the lower core layer 529 and the nonmagnetic insulating material layer 31 are formed in a continuous flat surface.

As shown in FIG. 13, a pole tip layer (protruding layer) 548 is formed on the lower core layer 529 to have a predetermined length from the surface facing the recording medium in the height direction. The width dimension of the pole tip layer 548 in the track width direction (the X direction) corresponds to the track width Tw. The track width Tw is, for example, 0.5 µm or less.

In the embodiment shown in FIG. 14, the pole tip layer 548 has a laminated structure comprising the three layers including a lower pole sub-layer 549, a gap sub-layer 550, and an upper pole sub-layer 551. The pole sub-layers 549 and 551 and the gap sub-layer 550 will be described below.

The lower pole sub-layer 549 is formed, by plating, as a bottom layer of the pole tip layer 548 on the lower core layer 529. The lower pole sub-layer 549 is made of a magnetic material, and is magnetically connected to the lower core layer 529. The lower pole sub-layer 549 may be made of the same material as or a different material from that of the lower core layer 529, and may be formed in a single layer film or a multilayer film.

Also, the nonmagnetic gap layer 550 is laminated on the lower pole sub-layer 549.

The gap layer 550 is made of a nonmagnetic metal material, and preferably formed on the lower pole sub-layer 549 by plating. As the nonmagnetic metal material, one or two or more materials are preferably selected from NiP, NiReP, NiPd, NiW, NiMo, NiRh, NiRe, Au, Pt, Rh, Pd, Ru, and Cr. The gap layer 550 may be formed in a single layer film or a multilayer film.

Next, the upper pole sub-layer 551 is formed on the gap layer 550 by plating so as to be magnetically connected to the upper core layer 560 described below. In this embodiment, the upper pole sub-layer 551 has a laminated structure comprising a lower layer 551a and an upper layer 551b. Each of the lower and upper layers 551a and 551b is made of a magnetic material, and the saturation magnetic flux density of the lower layer 551a is higher than that of the upper layer 551b.

As described above, when the gap layer 550 is made of a nonmagnetic metal material, the lower pole sub-layer 549, the gap layer 550 and the upper pole sub-layer 551 can be continuously formed by plating.

Furthermore, a back gap layer 533 is formed on the lower core layer 529 to be positioned at a predetermined distance from the rear end surface 548a of the pole tip layer 548 in the height direction (the Y direction).

The back gap layer 533 is made of a magnetic material, and may be made of the same material as or a different material from that of the lower core layer 529. The back gap layer 533 may be formed in a single layer or a multilayer structure. The back gap layer 533 is magnetically connected to the lower core layer 529.

Furthermore, a coil insulating underlying layer 534 is formed on the portion of the lower core layer 529 between the pole tip layer 548 and the back gap layer 533, and a plurality of first coil pieces 555 extending in the track width direction (the X direction) is formed to be parallel to each other in the height direction. Each of the first coil pieces 555 may be inclined from the track width direction (the X direction) to the height direction.

The first coil pieces 555 are covered with a coil insulating layer 536 made of an inorganic insulating material such as $Al_2O_3$ or the like. As shown in FIG. 13, the upper surfaces of the pole tip layer 548, the coil insulating layer 536, and the back gap layer 533 are formed in a continuous flat surface along the reference plane A shown in FIG. 13.

As shown in FIG. 14, connecting layers 561 with conductivity are formed as projections on the respective ends 555a of each first coil piece 555 in the track width direction (the X direction shown in the drawing). As the planar shape of each connecting layer 561 (the sectional shape take along the X-Y plane), any one of various shapes such as an elliptical shape, a circular shape, a square shape, a rectangular shape, a rhombic shape, and the like may be selected. Although the connecting layers 561 are preferably made of the same material as that of the back gap layer 533 from the viewpoint of the manufacturing process, the connecting layers 561 may be made of a material different from that of the back gap layer 533. Each of the connecting layers 561 may be formed in a single layer structure or a multilayer laminated structure. Although the connecting layers 561 are electrically connected to the respective ends 555a of each first coil piece 555, the expression "electrically connected" means that an electric current passes between two layers regardless of whether the connection is direct connection or indirect connection. This applies to the description below.

As shown in FIG. 14, the upper surfaces 561a of the connecting layers 561 formed on the respective ends 555a of each first coil piece 555 in the track width direction (the X direction shown in the drawing) are coplanar with the reference plane A. Namely, in the thin film magnetic head shown in FIG. 13, the upper surfaces of the pole tip layer 548, the coil insulating layer 536 and the back gap layer 533 and the upper surfaces 561 of the connecting layer 561 are formed in a same flat surface.

As shown in FIG. 13, a Gd-determining layer 538 is formed on the lower core layer 529 to extend from a position at a predetermined distance from the surface facing the recording medium in the height direction (the Y direction). Also, as shown in FIG. 13, the rear end of the upper pole sub-layer 551 is positioned on the Gd-determining layer 538. The gap depth (Gd) is determined by the length of the gap layer 550 from the surface facing the recording medium to the front end of the Gd-determining layer 538 in the height direction (the Y direction).

Furthermore, an upper core layer (magnetic layer) 560 is formed by plating on the upper pole sub-layer 551 and on the back gap layer 533. The upper core layer 560 connects the pole tip layer 548 to a rear portion of the lower core layer 529 in the height direction through the back gap layer 533. The upper core layer 560 corresponds to the magnetic layer according to the present invention.

Although the upper pole sub-layer 551 and the upper core layer 560 may be made of the same material, both layers are preferably made of different materials. Particularly, the upper core layer 560 preferably has a lower saturation magnetic flux density than that of the upper layer 551*b* of the upper pole sub-layer 551. For example, the saturation magnetic flux density of the upper core layer 560 is 1.4 T to 1.9 T, and the saturation magnetic flux densities of the lower and upper layers of the upper pole sub-layer 551 are 1.9 T to 2.4 T and 1.4 T to 1.9 T, respectively.

When the saturation magnetic flux density of the upper core layer 560 is lower than that of the upper pole sub-layer 551, magnetic recording with a leakage magnetic field from the upper core layer 560 can easily be prevented.

As shown in FIGS. 13 and 14, a plurality of second coil pieces 556 is formed on the insulating layers 558 and 563 to be parallel to each other in the height direction and inclined from the track width direction (the X direction) to the height direction (the Y direction). Each of the second coil pieces 556 may be formed in parallel with the track width direction (the X direction).

The second coil pieces 556 are nonparallel to the first coil pieces 555. As shown in FIG. 14, the left-hand end 555*a* of each first coil piece 555 in the track width direction is electrically connected to the right-hand end 556*a* of the corresponding second coil piece 556 in the track width direction through the connecting portion 561. In FIG. 14, the right-hand connecting portion 561 shown by dotted lines electrically connects the right-hand end of the first coil piece 555 behind (in the Y direction) the first coil shown in the drawing to the right-hand end 556*b* of the second coil piece 556 shown in the drawing.

In the thin film magnetic head shown in FIGS. 13 and 14, the first coil pieces 555 face the second coil pieces 556 with the upper core layer 560 provided therebetween in the thickness direction, and the ends of the first coil pieces 555 are electrically connected to the ends of the second coil pieces 556 in the track width direction through the connecting portions 561 to form a toroidal coil structure 557.

In FIG. 13, reference numeral 561 denotes the protecting layer made of $Al_2O_3$ or the like, and reference numeral 559 denotes a lead layer. The lead layer 559 is formed integrally with the rearmost second coil piece 556 in the height direction.

When a recording current is supplied to the coil layer 557, a recording magnetic field is induced in the lower core layer 529 and the upper core layer 560, and a leakage magnetic field occurs between the lower pole sub-layer 549 and the upper pole sub-layer 551 facing with the gap sub-layer 550 provided therebetween, so that a magnetic signal is recorded on the recording medium such as a hard disk or the like with the leakage magnetic field.

In the thin film magnetic head shown in FIG. 13, the plurality of first coil piece 555 is formed in the space surrounded by the lower core layer 529, the pole tip layer 548 and the back gap layer 533. The space for forming the first coil pieces 555 can be properly formed by projecting the pole tip layer 548 and the back gap layer 533 on the lower core layer 529. Particularly, the pole tip layer 548 and the back gap layer 533 are formed by plating, and thus the pole tip layer 548 and the back gap layer 533 can be thickly formed to widen the space surrounded by the lower core layer 529, the pole tip layer 548 and the back gap layer 533, thereby facilitating the formation of the first coil pieces 555 to the predetermined thickness.

The connecting layers 561 are formed as projections on the ends 555*a* of each first coil piece 555 in the track width direction. However, the upper surfaces of the connecting layers 561 are coplanar with the upper surfaces of the pole tip layer 548, the back gap layer, and the coil insulating layer 536, and thus the upper surfaces of the connecting layers 561 are exposed from the flat surface.

In the thin film magnetic head shown in FIG. 13, therefore, the upper core layer 560 can be formed on the flat surface including the upper surfaces of the pole tip layer 548, the coil insulating layer 536 and the back gap layer 533, and thus the upper core layer 560 can be precisely formed in the predetermined shape with predetermined dimensions.

Furthermore, in the thin film magnetic head shown in FIG. 13, the upper surfaces 561*a* of the connecting layers 561 are exposed from the flat surface flash with the upper surface of the coil insulating layer 536, and thus the ends of the second coil pieces 556 in the track width direction (the X direction) can be easily, securely and electrically connected to the connecting layers 561, thereby suppressing defective electrical contacts between the first coil pieces 555 and the second coil pieced 556.

Also, as described above, the upper surfaces of the coil insulating layer 536, the pole tip layer 548, the back gap layer 533 and the connecting layers 561 are formed in the same flat surface to promote thinning of the whole thin film magnetic head.

The upper surfaces of the pole tip layer 548 and the back gap layer 533 are connected to each other by the linear upper core layer 560 parallel to the film plane to form a magnetic path. Thus, the magnetic path can be shortened to increase the rate of magnetic reversal, and a thin film magnetic head having excellent high-frequency characteristics can be formed.

Each of the first coil pieces 555 and the second coil pieces 556 is made of a material with excellent conductivity, such as Cu, Au, or the like. However, the connecting layers 561 may be made of the same material as or a different material from that of the first coil pieces 555 and the second coil pieces 556, and may be made a magnetic material as long as it has conductivity. The connecting layers 561 are preferably made of the same magnetic material as that of the pole tip layer 548. As a result, the connecting layers 561 can be formed in the same step as that for forming the pole tip layer 548 and the back gap layer 533, thereby speeding up the manufacture process.

As described above, the upper surface of the coil insulating layer 536 is planarized, and thus the coil insulating layer 536 is preferably made of an inorganic insulating material such as $Al_2O_3$, $SiO_2$, or the like.

In the thin film magnetic head shown in FIG. 14, a first insulating sub-layer 558 made of an inorganic insulating material such as alumina or the like is formed on the upper surface 560*a* of the upper core layer 560. The first insulating sub-layer 558 is also formed on the coil insulating layer 536 which extends to both sides of the upper core layer 560 in the track width direction (the X direction).

Furthermore, second insulating sub-layers 563 made of an organic insulating material such as resist or the like are formed on both sides 558*a* of the first insulating sub-layer 558 in the track width direction (the X direction) to further extend beyond both end surfaces 560*b* of the upper core layer 560 in the track width direction.

The second insulating sub-layers 563 are not provided on the central portion 558*b* of the first insulating sub-layer 558 in the track width direction, which is formed on the upper surface 560*a* of the upper core layer 560, and in the central portion in the track width direction, the upper core layer 560 faces the second coil pieces 556 with only the first insulating sub-layer 558 provided therebetween to bring the upper surface 560*a* of the upper core layer 560 near to the bottoms of the second coil pieces 556. Therefore, a recording magnetic field effectively enters into the upper core layer 560 from the second coil pieces 556 to effectively improve the magnetization efficiency.

Particularly, the first insulating sub-layer 558 made of an inorganic insulating material is formed by sputtering, and thus the first insulating sub-layer 558 can be formed to a smaller thickness than that of the second insulating sub-layers 563 made of an organic insulating material. Therefore, the upper core layer 560 can be brought near to the second coil pieces 556 described below, thereby improving the magnetization efficiency.

On the other hand, the second insulating sub-layers 563 made of an organic insulating material are formed on both sides 558a of the first insulating sub-layer 558 to further extend beyond both end surfaces 560b of the upper core layer 560 in the track width direction. Therefore, the second insulating sub-layers 563 are necessarily interposed between both end surfaces 560b of the upper core layer 560 and the second coil pieces 556 to sufficiently maintain insulation between the upper core layer 560 and the second coil pieces 556.

The formation portion of the second insulating sub-layers 563 is similar to that of the second insulating sub-layers 63 shown in FIG. 3. The formation position of the second insulating sub-layers 563 will be described with reference to FIG. 15. The second insulating sub-layers 563 may be formed in a region including at least the formation region of the second coil pieces 556 at least in the height direction (the Y direction shown in the drawing) from the surface facing the recording medium.

Figure 15:
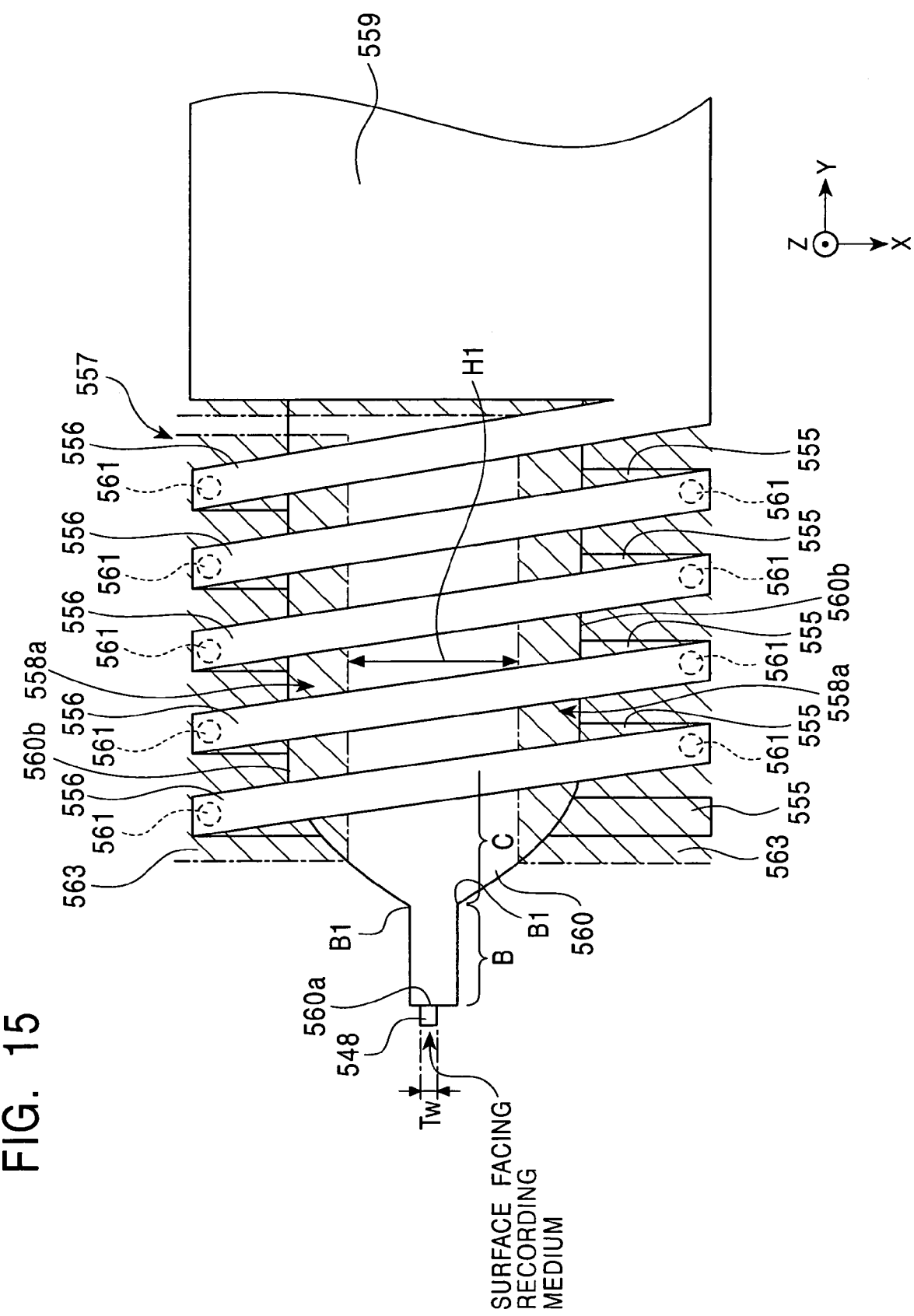
FIG. 15 is a partial plan view showing the coil shape of a coil layer and the positional relationship between the coil layer and a magnetic pole layer of the thin film magnetic head shown in FIG. 13.
Figure 16:
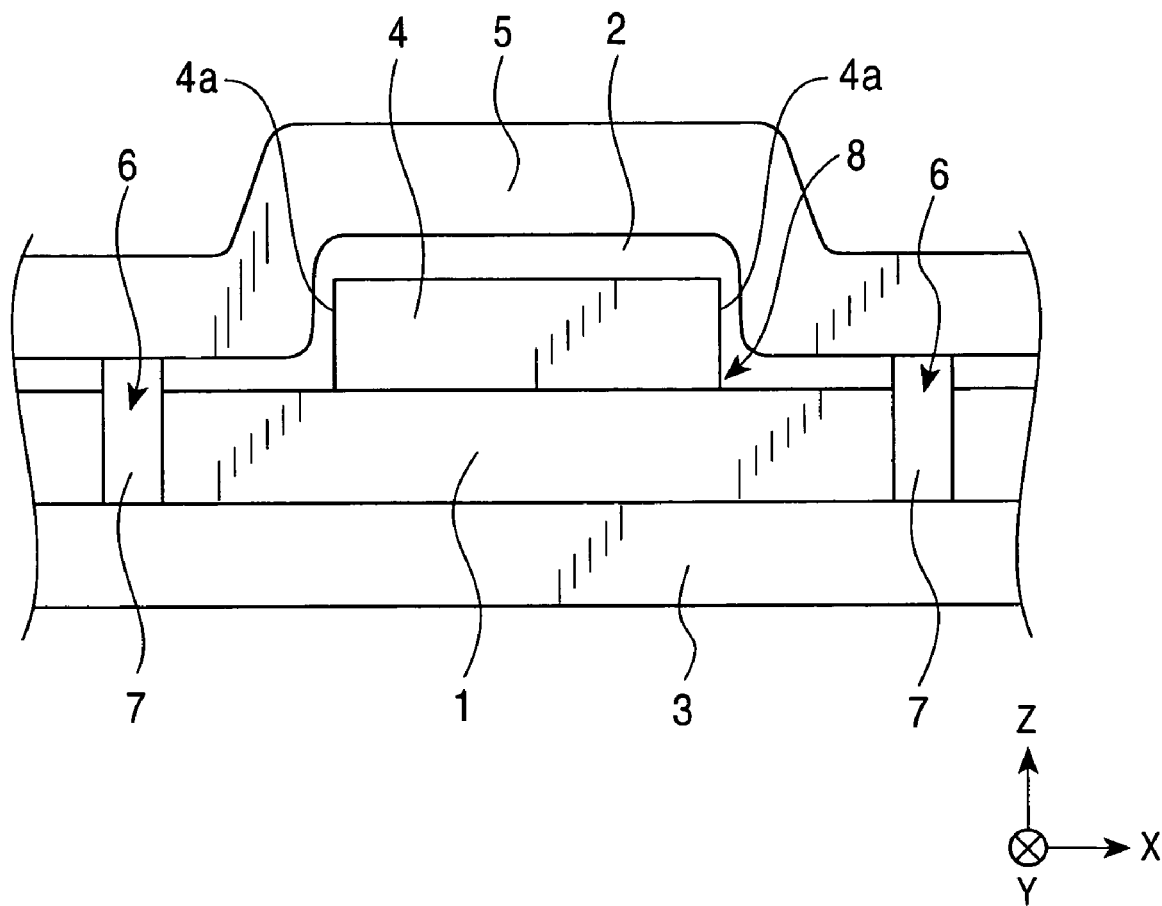
FIG. 16 is a partial front view of a conventional thin film magnetic head estimated from the description of Japanese Unexamined Patent Application Publication Nos. 2000-311311 and 2002-170205.

In FIG. 15, the formation region of the second insulating sub-layers 563 is shadowed. In this figure, the first insulating sub-layer 558 is omitted (the formation position of the first insulating sub-layer 558 is denoted by reference numeral). The planar shape of the upper core layer 560 formed below the first insulating sub-layer 558 is clearly shown instead.

As shown in FIG. 15, the second insulating sub-layers 563 are formed on both sides 558a of the first insulating sub-layer 558 in the track width direction within a region extending in the height direction and including the formation region of the second coil pieces 556. As shown in FIG. 15, the pole tip layer 548 is formed below the front end of the upper core layer 560. The pole tip layer 548 has a dimension corresponding to the track width Tw at the surface facing the recording medium.

The upper core layer 560 comprises a front end portion B extending in the height direction while maintaining the predetermined width dimension, and a rear end portion C in which the width dimension between both base ends B1 of the front end portion B in the track width direction increases in the height direction. As shown in FIG. 15, the second coil pieces 556 are not provided on the front end portion B, and thus the second insulating sub-layers 563 are not provided on the front end portion B. The second insulating sub-layers 563 are provided only on the rear end portion C in which the second coil pieces 556 are formed. The second insulating sub-layers 563 are provided for securing insulation between the second coil pieces 556 and both end surfaces 560b of the upper core layer 560, and it is thus sufficient to provide the second insulating sub-layers 563 on at least the rear end portion C of the upper core layer 560 in which the second coil pieces 556 are formed.

The average distance H1 (the average distance between the bottoms of the second insulating sub-layers 563 in the track width direction) (refer to FIGS. 14 and 15) between the second insulating sub-layers 563 provided on both sides 558a of the first insulating sub-layer 558 in the track width direction (the X direction shown in the drawings) defines an area where only the first insulating sub-layer 558 is interposed between the second coil pieces 556 and the upper core layer 560. Therefore, in order to improve the magnetization efficiency, the average distance H1 is preferably larger than at least the track width Tw. More specifically, in the rear end portion C of the upper core layer 560 shown in FIG. 14, the average width H2 between both end surfaces 560b of the laminate 62 in the track width direction (the average distance between the boundaries between the upper surface 560a and both side surfaces 560b of the upper core layer 560 in the track width direction within the region from the front end surface of the second coil piece 556 nearest to the surface facing the recording medium to the rear end surface of the rearmost second coil piece 556 in the height direction) is in the range of 5 to 20 µm. The average width H3 of the second insulating sub-layers 563 deposited on both sides 558a in the track width direction (the average width between the boundary between the inner end of each second insulating sub-layer 563 and its lower surface and the boundary between the upper surface 560a of the upper core layer 560 and each side surface 560b in the track width direction) is in the range of 1 to 5 µm, and the average distance H1 is in the range of 3 to 18 µm.

As shown in FIG. 15, the second coil pieces 556 are provided on the rear end portion C of the upper core layer 560, not provided on the front end portion B. If the second coil pieces 556 are provided on the front end portion B, the second insulating sub-layers 563 must be provided on the front end portion B, and thus the average distance H1 between the second insulating sub-layers 563 becomes smaller than the track width Tw on the front end portion B, thereby easily decreasing the magnetization efficiency. Therefore, as shown in FIG. 15, the rear end portion C having a wider area than that of the front end portion B is preferably effectively used for providing the second coil pieces 556 on the rear end portion C so that the second insulating sub-layers 563 are partially provided on the rear end portion C, for increasing the average distance H1 between the second insulating sub-layers 563 and improving the magnetization efficiency.

As described above, the first insulating sub-layer 558 is made of an inorganic insulating material such as $Al_2O_3$ or the like, and the second insulating sub-layers 563 are made of an organic insulating material such as resist or the like. The first insulating sub-layer 558 is formed by sputtering deposition. The first insulating sub-layer 558 is actually formed by sputtering deposition not only on the upper surface 560a of the upper core layer 560 but also on the upper surface of the coil insulating layer 536 extending to both sides of the upper core layer 560 in the track width direction (the X direction). Since the first insulating sub-layer 558 is formed by sputtering deposition of an inorganic insulating material, the first insulating sub-layer 558 can easily be formed to a small thickness T1 (refer to FIG. 14). For example, the thickness T1 is preferably 0.2 to 1.0 µm. Therefore, in the region where only the first insulating sub-layer 558 is interposed, the distance between the upper surface 560a of the upper core layer 560 and the lower surface of each second coil piece 556 is effectively decreased to improve the magnetization efficiency. Also, the thickness of the first insulating sub-layer 558 formed on the upper surface 560a of the upper core layer 560 can easily be controlled to secure a small thickness T1 sufficient to prevent the occurrence of pinholes, thereby easily sufficiently maintaining insulation between the upper surface 560a of the upper core layer 560 and the lower surface of each second coil piece 556.

On the other hand, the second insulating sub-layers 563 made of an organic insulating material are formed by coating resist or the like having high viscosity, and thus both end surfaces 560b of the upper core layer 560, to which the first insulating sub-layer 558 does not sufficiently adheres, can be completely covered with the second insulating sub-layers 563. After coating, the second insulating sub-layers 563 made of the resist or the like are cured by a heat treatment or the like to completely coat the second insulating sub-layers 563 on both ends 558a of the first insulating sub-layer 558 and both end surfaces 560b of the upper core layer 560.

The average thickness T2 of the second insulating sub-layers 563 formed on both ends 558a of the first insulating sub-layer 558 is preferably larger than the average thickness T1 of the first insulating sub-layer 558. The average thickness T2 of the second insulating sub-layers 563 is preferably in the range of 0.3 to 3 µm. When the average thicknesses T1 and T2 of the first and second insulating sub-layers 558 and 563 are controlled as described above, the upper surface 560a of the upper core layer 560 can be brought nearer to the lower surfaces of the second coil pieces 556 to improve the magnetization efficiency and improve the insulation between both end surfaces 560b of the upper core layer 560 and the second coil pieces 556.

In order to secure insulation between both end surfaces 560b of the upper core layer 560 and the second coil pieces 556, it is possibly ideal to partially provide the second insulating sub-layers 563 only on both end surfaces 560b of the upper core layer 560. However, in order to completely cover both end surfaces 560b of the upper core layer 560, the second insulating sub-layers 563 are preferably deposited on both sides 558a of the first insulating sub-layer 558. Also, when the second insulating sub-layers 563 are not sufficiently provided to fail to completely cover both side surfaces 560b of the upper core layer 560, sharp steps easily occur between the upper surfaces of the second insulating sub-layers 563 and the upper surface of the first insulating sub-layer 558 formed on the upper surface 560a of the upper core layer 560, thereby causing a problem in which the second coil pieces 556 cannot be formed in a predetermined pattern. Therefore, in the present invention, the second insulating sub-layers 563 are provided on both sides 558a of the first insulating sub-layer 558 formed on the upper core layer 560 to extend beyond both end surfaces 560b of the upper core layer 560 in the track width direction.

In this embodiment, the upper core layer 560 and the upper pole sub-layer 551 of the pole tip layer 548 are made of different materials, so that the only the upper pole sub-layer 551 can be made of a material having a high saturation magnetic flux density, and the upper core layer 560 can be made of a material having a lower saturation magnetic flux density than that of the upper pole sub-layer 551. Since the upper pole sub-layer 551 having a high saturation magnetic flux density and the lower pole sub-layer 549 are not formed behind the Gd-determining layer 538, the magnetic flux density can be properly controlled to decrease a magnetic flux leakage from both sides of the pole tip layer 548, thereby improving the S/N ratio of the magnetic head.

Also, the front end surface 560a of the upper core layer 560 is retracted from the surface facing the recording medium in the height direction to further decrease a magnetic flux leakage from the upper core layer 560.

In this embodiment, the thickness t1 of the second coil pieces 556 formed on the upper core layer 560 is larger than the thickness t2 of the first coil pieces 555, and the length dimension W2 of each second coil piece 556 in the first direction perpendicular to the direction of a current flow is larger than the length dimension W1 of each first coil piece in the first direction, thereby decreasing the resistance. Namely, the heat generation from the coil layer 557 can be decreased to decrease the projection of the periphery of the pole tip layer 548 toward the recording medium.

In the magnetic head shown in FIGS. 13 and 14, the upper surfaces of the pole tip layer 548 and the back gap layer 533 are connected to each other by the upper core layer 560 having a flat shape to form the magnetic path. Therefore, the magnetic path can be shortened, as compared with a magnetic head in which an upper core layer rises. With the upper core layer 560 having a flat shape, the Joule heat generated from the coil layer 557 can be efficiently released to the outside of the magnetic head.

Furthermore, the coil layer 557 has a toroidal coil structure in which it is wound around the upper core layer 560.

Therefore, even when the turn number of the coil layer 557 constituting the magnetic head is decreased, predetermined recording characteristics can be maintained. Since the coil resistance can be decreased by decreasing the turn number, the heat generation of the magnetic head can be suppressed even in driving of the magnetic head.

When the heat generation of the magnetic head can be suppressed, the problem of projecting the periphery of the pole tip layer 548 from the surface facing the recording medium can be prevented.

Furthermore, the coil insulating layer 536 covering the coil layer 557 is made of an inorganic insulating material, and thus the thermal expansion coefficient of the magnetic head can be decreased.

Like in the magnetic head shown in FIG. 5, even in the magnetic head comprising the pole tip layer 548 and the upper core layer 560, the second coil pieces 556 may be electrically connected to the first coil layers 555 through rising layers and the connecting layers 561 formed on both sides of the upper core layer 560 in the track width direction (the X direction). The thin film magnetic head of the present invention described in detail above can be incorporated into a magnetic head device mounted on, for example, a hard disk device or the like. The thin film magnetic head may be incorporated into either a flying magnetic head or a contact magnetic head. The thin film magnetic head can also be used for a magnetic sensor or the like other than the hard disk device.

What is claimed is:

1. A thin film magnetic head comprising:
   a lower core layer extending from a surface facing a recording medium in a height direction;
   a magnetic layer connected directly or indirectly to the lower core layer at a predetermined distance from the surface facing the recording medium; and
   a coil layer toroidally wound around the magnetic layer;
   wherein a plurality of first coil pieces extending in a direction crossing the magnetic layer is disposed on the lower core layer with predetermined intervals in the height direction, the first coil pieces being covered with a coil insulating layer on which the magnetic layer is formed;
   a plurality of second coil pieces crossing the magnetic layer is disposed on the magnetic layer with an insulating layer provided therebetween so that ends of each second coil piece face the ends of each first coil piece in a thickness direction;

the insulating layer comprises a first insulating sub-layer of an inorganic insulating material formed on a top of the magnetic layer, and second insulating sub-layers of an organic insulating material formed on both sides of the first insulating sub-layer in a track width direction within a region extending in the height direction and including a formation region of the second coil pieces; and the second insulating sub-layers are formed on both sides of the first insulating sub-layer to have a space larger than at least a track width in the track width direction, and extend beyond both end surfaces of the magnetic layer in the track width direction so as to be interposed between the second coil pieces and both end surfaces of the magnetic layer, wherein the second insulating sub-layers have joint surfaces with the second coil pieces between the second coil pieces and both end surfaces of the magnetic layer, the joint surfaces being inclined toward the first coil piece side away from at least both end surfaces of the magnetic layer.

2. The thin film magnetic head according to claim 1, wherein the magnetic layer has a front end portion in which a width dimension at the surface facing the recording medium corresponds to a track width, and the width dimension is constant or gradually increases in the height direction, and a rear end portion in which a width between both base ends of the front end portion in the track width direction increases in the height direction, and the second insulating sub-layers and second coil pieces are provided on a rear end portion.

3. The thin film magnetic head according to claim 1, wherein a pole tip layer comprising at least a lower pole sub-layer, a gap sub-layer made of a nonmagnetic metal material, and an upper pole sub-layer, which are formed by plating in turn from below, is formed on the lower core layer so that a track width Tw is defined by a width dimension of the pole tip layer in the track width direction at the surface facing the recording medium, and the magnetic layer is laminated on the pole tip layer.

4. The thin film magnetic head according to claim 3, wherein the magnetic layer has a lower saturation magnetic flux density than that of the upper pole sub-layer.

5. The thin film magnetic head according to claim 1, wherein an average thickness of the first insulating layer is smaller than that of the second insulating sub-layers formed on both sides of the first insulating sub-layer.

6. The thin film magnetic head according to claim 1, wherein a distance between adjacent ends of at least one pair of adjacent first coil pieces in the height direction is larger than a minimum distance between the first coil pieces in a region where the first coil pieces overlap with the magnetic layer.

7. The thin film magnetic head according to claim 6, wherein the plurality of the first coil pieces has parallel portions in the region where the first coil pieces overlap with the magnetic layer.

8. The thin film magnetic head according to claim 1, wherein a distance between adjacent ends of at least one pair of adjacent second coil pieces in the height direction is larger than a minimum distance between the second coil pieces in a region where the second coil pieces overlap with the magnetic layer.

9. The thin film magnetic head according to claim 8, wherein the plurality of the second coil pieces has parallel portions in the region where the second coil pieces overlap with the magnetic layer.

10. The thin film magnetic head according to claim 1, wherein a length dimension of each second coil piece in a first direction perpendicular to a current flow direction is larger than a length dimension of each first coil piece in the first direction.

11. The thin film magnetic head according to claim 1, wherein a thickness of each second coil piece is larger than a thickness of each first coil piece.

* * * * *